US011184458B1

(12) United States Patent
 Suckel

(10) Patent No.: US 11,184,458 B1
(45) Date of Patent: Nov. 23, 2021

(54) PROXY SELECTION BY MONITORING QUALITY AND AVAILABLE CAPACITY

(71) Applicant: TESO LT, UAB, Vilnius (LT)

(72) Inventor: Vitalij Suckel, Vilnius (LT)

(73) Assignee: TESO LT, UAB, Vilnius (LT)

( * ) Notice: Subject to any disclaimer, the term of this patent is extended or adjusted under 35 U.S.C. 154(b) by 0 days.

(21) Appl. No.: 17/217,856

(22) Filed: Mar. 30, 2021

(51) Int. Cl.
 G06F 15/173 (2006.01)
 H04L 29/08 (2006.01)
 H04L 12/26 (2006.01)
 H04L 29/06 (2006.01)

(52) U.S. Cl.
 CPC .......... *H04L 67/2866* (2013.01); *H04L 43/10* (2013.01); *H04L 63/08* (2013.01)

(58) Field of Classification Search
 CPC ...... H04L 67/2866; H04L 63/08; H04L 43/10
 See application file for complete search history.

(56) References Cited

U.S. PATENT DOCUMENTS

| 6,829,638 | B1* | 12/2004 | McBrearty .......... H04L 67/1008 709/203 |
| 9,936,261 | B2 | 4/2018 | Albano et al. |
| 10,735,540 | B1* | 8/2020 | Sharma ............... H04L 67/1097 |
| 2019/0037026 | A1* | 1/2019 | Brooks ................... H04L 67/14 |
| 2020/0177682 | A1* | 6/2020 | Brooks ................... H04L 67/42 |
| 2020/0186859 | A1* | 6/2020 | Gazzini ............. H04N 21/8547 |

FOREIGN PATENT DOCUMENTS

| CN | 105245607 | 12/2018 |
| CN | 111611512 | 9/2020 |
| JP | 10-222412 | 8/1998 |

\* cited by examiner

*Primary Examiner* — Richard G Keehn
(74) *Attorney, Agent, or Firm* — FisherBroyles. LLP; Keats Quinalty

(57) ABSTRACT

Empirical data of exit nodes are continuously monitored and each exit node's overall performance and available capacity are calculated. The empirical data can include monitoring the number of concurrent requests currently being executed by each exit node and the disconnection chronology of each exit node. Further, each exit node is tested by benchmark requests and ping messages and each exit node's quality rate is calculated. Additionally, systems and methods are provided to select an exit node with the highest quality and available capacity value, from a particular pool to route the user request.

25 Claims, 11 Drawing Sheets

PROXY SELECTION BY MONITORING QUALITY AND AVAILABLE CAPACITY

FIELD

The present embodiments generally relate to methods and systems for improving proxy services, especially to select proxy servers to route user requests for data extraction, by evaluating proxy servers' performance quality and the capacity to execute concurrent connections.

BACKGROUND

Proxy servers are intermediary servers that accept users' requests and forward the requests to other proxy servers, source servers, or service the request from their cache. In simple terms, a proxy server acts as a gateway between the user's device and the website they want to access. Proxy servers change the user's IP address so that the actual IP address of the user is not revealed to the destination server. In networking terms, IP address stands for Internet Protocol address which is a numerical label assigned to each device connected to a network that uses the Internet Protocol for communication. In a more general sense, an IP address functions as an online address because devices use IPs to locate and communicate with each other. Using a proxy server increases privacy and allows users to access websites that might not normally be accessed. Proxy servers are easy to use, and many multinational enterprises also prefer them for their online working.

Many organizations employ proxy servers to maintain better network performance. Proxy servers can cache common web resources—so when a user requests a particular web resource, the proxy server will check to see if it has the most recent copy of the web resource, and then sends the user the cached copy. This can help reduce latency and improve overall network performance to a certain extent. Here, latency refers specifically to delays that take place within a network. In simpler terms, latency is the time between user action and the website's response or application to that action—for instance, the delay between when a user clicks a link to a webpage and when the browser displays that webpage.

Proxies can be divided into different types depending on what functions are provided or what servers are used. Proxies can also be divided into Residential Internet Protocol (IP) proxies, Datacenter IP proxies, and Mobile IP proxies. A Residential IP address is an address from the range specifically designated by the owning party as assigned to private customers. Usually a Residential proxy is an IP address linked to a physical device, for example, mobile phone or desktop computer, however businesswise the blocks of Residential IP addresses may be bought from the owning Proxy Service Provider by another company directly, in bulk. The real owners of the Residential IP address ranges, namely Internet service providers (ISPs), register residential IP addresses in public databases, which allows websites to determine a device's Internet provider, network, and location. Datacenter IP proxy is the proxy server assigned with a datacenter IP. Datacenter IPs are IPs owned by companies, not by individuals. The datacenter proxies are actually IP addresses that are not located in a natural person's home. Instead, the datacenter proxies are associated with a secondary corporation. Mobile IP proxies may be considered a subset of the Residential proxy category. A mobile IP proxy is essentially one IP address that is obtained from mobile operators. Mobile IP proxies use mobile data, as opposed to a residential proxy that uses broadband ISPs or home Wi-Fi.

Likewise, exit node proxies, or simply exit nodes, are proxies, and through these proxies the request from the user (or the entry node) reaches the Internet. There can be several proxies used to perform a user's request, but an exit node proxy is the final proxy that contacts the target and forwards the information from the target to the queue to reach the user. In the current embodiments proxies and exit nodes can be used as synonyms. The current embodiments are not limited only to the exit nodes and same technologies can be used for the proxies. However, the term exit node is employed in the current description to clarify the technical differences between exit nodes and proxies. Inherently the exit node device is external to the proxy service provider infrastructure, usually belonging to a private customer e.g. a smartphone, a computer, a TV, or an other Internet-enabled electronic device.

Classifications of proxy servers are also based on protocols on which a particular proxy may operate. For instance, HTTP proxies, SOCKS proxies and FTP proxies are some of the protocol-based proxy categories. The term HTTP stands for Hypertext Transfer Protocol, the foundation for any data exchange on the Internet. Over the years, HTTP has evolved and extended, making it an inseparable part of the Internet. HTTP allows file transfers over the Internet and, in essence, initiates the communication between a client/user and a server. HTTP remains a crucial aspect of the World Wide Web because HTTP enables the transfer of audio, video, images, and other files over the Internet. HTTP is a widely adopted protocol currently available in two different versions—HTTP/2 and the latest one—HTTP/3.

HTTP proxy can act as a high-performance proxy content filter. Similar to other proxies, HTTP proxy works as an intermediary between the client browser and the destination web server. HTTP proxy can save much bandwidth through web traffic compression, caching of files and web pages from the Internet. Here, bandwidth refers to the amount of data that can be transferred from one point to another within a network in a specific amount of time. Typically, bandwidth is expressed as a bitrate and measured in bits per second (bps). HTTP proxy is a feasible option for companies that need to access ad-heavy websites. Furthermore, HTTP proxies allow many users to utilize the connection concurrently, making HTTP proxies useful for companies with a large number of employees. In short, HTTP proxies can be understood as an HTTP tunnel, i.e., a network link between devices with restricted network access.

The next type of proxy is the SOCKS proxy; SOCKS refers to an Internet protocol that allows one device to send data to another device through a third device. In other words, this device would be called a SOCKS server or a SOCKS proxy. Specifically, a SOCKS proxy creates a connection to any other server that stands behind a firewall, and exchanges network packets between the client and the actual server. SOCKS proxies are usually needed where a TCP connection is prohibited, and data can be reached only through User Datagram Protocol (UDP). SOCKS proxies are a tool that allows for a specific way to connect to the Internet. SOCKS5 is the latest version of the SOCKS protocol. The difference between SOCKS5 and older versions of it is its improved security and the ability to support UDP traffic.

SOCKS proxies are often used for live calls or streaming. Streaming websites commonly use UDP to send data and currently, SOCKS is the main type of proxies that can handle a UDP session. In order to use a SOCKS proxy, the user's device must have the capability to handle SOCKS protocol and must be able to operate and maintain a SOCKS proxy server. The main problem with SOCKS proxies is that the protocol does not have standard tunnel encryption. Since the SOCKS request carries data in cleartext, SOCKS proxies are not recommended for situations where "sniffing" is likely to occur.

Similar to HTTP and SOCKS, the term FTP refers to one of the protocols used to move files on the Internet. The term FTP stands for File Transfer Protocol. In FTP, a control connection is used to send commands between an FTP client and an FTP server. However, the file transfers occur on a separate connection called the data connection. The FTP proxy can offer enhanced security for uploading files to another server. Moreover, the FTP proxy typically offers a cache function and encryption method, making the transmission process secure and safe from hackers.

Modern proxy servers do much more than simply forwarding web requests. Proxy servers act as a firewall and web filter, provide shared network connections, and cache data to speed up common requests. Proxy servers can provide a high level of privacy. Proxy servers can also be used to control internet usage of employees and children (e.g., organizations and parents set up proxy servers to control and monitor how their employees or kids use the Internet) or improve browsing speed and save the bandwidth. Proxies can be used to bypass certain Internet restrictions (e.g. firewalls) by enabling a user to request the content through a (remote) proxy server instead of accessing the content directly. Proxy servers are often used to get around geo-IP based content restrictions. If someone wants to get content from, for example a US webpage, but they do not have access from their home country, they can make the request through a proxy server that is located in the USA (and has a US IP address). Using proxy services, the user's traffic seems to be coming from the USA IP address. Proxies can also be used for web scraping, data mining, and other similar tasks.

A proxy provider can control the quality of proxies and decide which IP addresses will be used for users in a set of proxies. If the same proxy is used for too many requests, it will ultimately be banned by the ISP or the web page, and it will not be possible to use such a proxy to make subsequent requests. If too many requests come in from one IP address in a short period of time, then the site will block the requests from that proxy for a pre-set period of time.

The problem mentioned above is most often encountered in web scraping. Web scraping (also known as screen scraping, data extraction, web harvesting) in its most general sense is the automated gathering of data from the internet. More technically, web scraping is the practice of gathering data from the internet through any means other than a human using a web browser or a program interacting with an application programming interface (API). Web scraping is usually accomplished by a program that queries a web server and requests data automatically, then parses the data to extract the requested information.

Web scrapers are programs written for web scraping. Web scrapers can have a significant advantage over other means of accessing information e.g., web browsers. The latter is designed to present the information in a readable way for humans, whereas web scrapers are excellent at collecting and processing large amounts of data quickly. Rather than opening one page at a time through a monitor (as web browsers do), web scrapers can view large databases consisting of thousands or even millions of pages at once.

Sometimes the website allows another automated way to transfer its structured data from one program to another via an API. Typically, a program will request an API via Hypertext Transfer Protocol (HTTP) for some type of data, and the API will return this data from the website in the structured form. It serves as a medium to transfer the data. However, using APIs is not considered web scraping since the API is offered by the website (or a third party), removing the need for web scrapers.

An API can transfer well-formatted data from one program to another, and the process of using it is easier than building a web scraper to get the same data. However, APIs are not always available for the needed data. Also, APIs often use volume and rate restrictions and limit the types and the format of the data. Thus, a user would use web scraping for the data for which an API does not exist or restricted in any way by the API. As previously mentioned, here API is an acronym for application programming interface. In the most general sense, API is a programming interface consisting of one or more endpoints to a defined request-response message system.

Usually, web scraping includes the following steps—a) retrieving Hypertext Markup Language (HTML) data from a website; b) parsing the data for target information; c) saving target information; d) repeating the process if needed on another page. A program that is designed to do all of these steps is called a web scraper. Another related program known as the web crawler (also known as a web spider) is a program or an automated script which performs the first task, i.e. it navigates the web in an automated manner to retrieve raw HTML data of the accessed web sites (the process also known as indexing).

There are techniques that websites use to stop or slow down a web scraper since scraping may overload the website. For example, they may try to identify the web scraper's IP address and block it to prevent further access by the bot. To do that, the website needs to identify the bot-like behavior of the web scraper and to identify its IP address.

Recognizing the bot-like behavior can be done in multiple ways. One involves a limit on the rate of actions (or actions over time) since humans typically perform fewer actions than a bot would. To circumvent this, web scrapers often choose to employ proxies that mask the real IP address of the web scraper and perform web scraping through multiple proxy IP addresses at the same time to both keep up the gathering speed and avoid being blocked.

Proxy providers face a set of problems related to both web scraping and data extraction activities. For scraping, it is essential to provide the user with the exit nodes that have a lower probability of being blocked. Additionally, the exit nodes provided to the user must be reliable and fast. Otherwise, the web scraping/data extraction process will be hindered because of the proxies' quality.

In case the exit node disconnects during a scraping session, interrupting the established path toward the target web server the user has to reconnect to the target web server. If the user is assigned a different exit node upon reconnection, the website may demand to repeat authentication or confirm human interaction. One must understand that repeated authentication also interrupts the quality of service.

Because a proxy can create many connections to different targets at the same time, a proxy provider might misleadingly use the same exit node to implement user's requests believing that the proxy's capacity is sufficient. Nevertheless, due to high traffic, the exit node can be incapable of performing the requests properly, or either cannot reach the target, or the response time increases, sometimes to a great extent. This can cause the proxy provider to repeat the request one more time, using additional resources of the exit node for the same requests again and again. When a proxy provider offers proxies, proxy providers may not be sure about a particular exit node's suitability for executing a specific proxying request without a thorough analysis of the exit node's capacity and quality. For example, problems can arise when proxy providers are not aware of whether an exit node's speed or geo-location is sufficient to successfully extract data from a specific target server.

SUMMARY

To solve the problems mentioned above, in one aspect, the present embodiments detailed herein provide an exemplary system and method to select and implement users' requests through exit nodes in such a way that the risk of being blocked by target servers is alleviated. Moreover, the embodiment ensures that the exit nodes are utilized essentially to their fullest capacity.

The embodiments detailed herein provide a system and method for selecting an exit node to implement the user's request by calculating the quality and capacity of each exit node belonging to multiple server pools of a proxy provider. Moreover, after calculating the quality and capacity of exit nodes, the embodiment assigns ratings to each exit node, according to which an exit node is selected to service the user's request.

The present embodiments provide at least some of the following solutions: a) reduces the error rate received from the web server by increasing service quality for user requests due to exit node availability; b) allows for the service provider to select appropriate exit node(s) easier according to the target and the nature of the user's request; c) increases the speed for fetching the data from the web server as requested by a user device.

To improve the quality of a proxy service, solutions are provided wherein methods are disclosed to utilize proxy servers, especially exit nodes, to their fullest capacity without being blocked by target websites. The embodiments presented herewith, at least in one aspect, provide a system and method for selecting exit nodes to service user requests for data extraction and gathering from a web server, by calculating the quality rate and computing the available capacity for each exit node. The proxy service provider computes an exit node's available capacity based on counting and tallying the present number of concurrent connections with the concurrent threshold, which is the maximum available capacity. So, through the exemplary embodiment, user requests can be equally distributed between all exit nodes in a server pool as each exit node in a server pool is rated according to its quality and the number of concurrent connections it can perform at the same time. The rating and smart distribution of the user requests among exit nodes can alleviate the risk of exit nodes being blocked by the target web server. Additionally, these exemplary embodiments help improve the speed of fetching the data from the web server.

The present embodiments provide at least some of the following solutions: a) reduces the error rate received from the web server by increasing service quality for user requests due to exit node availability; b) allows for the service provider to select appropriate exit node(s) easier according to the target and the nature of the user's request; c) increases the speed for fetching the data from the web server as requested by a user device.

DESCRIPTION OF DIAGRAMS

FIG. 1 presents a block diagram of an exemplary architectural depiction of components.

DETAILED DESCRIPTION

Figure 1:
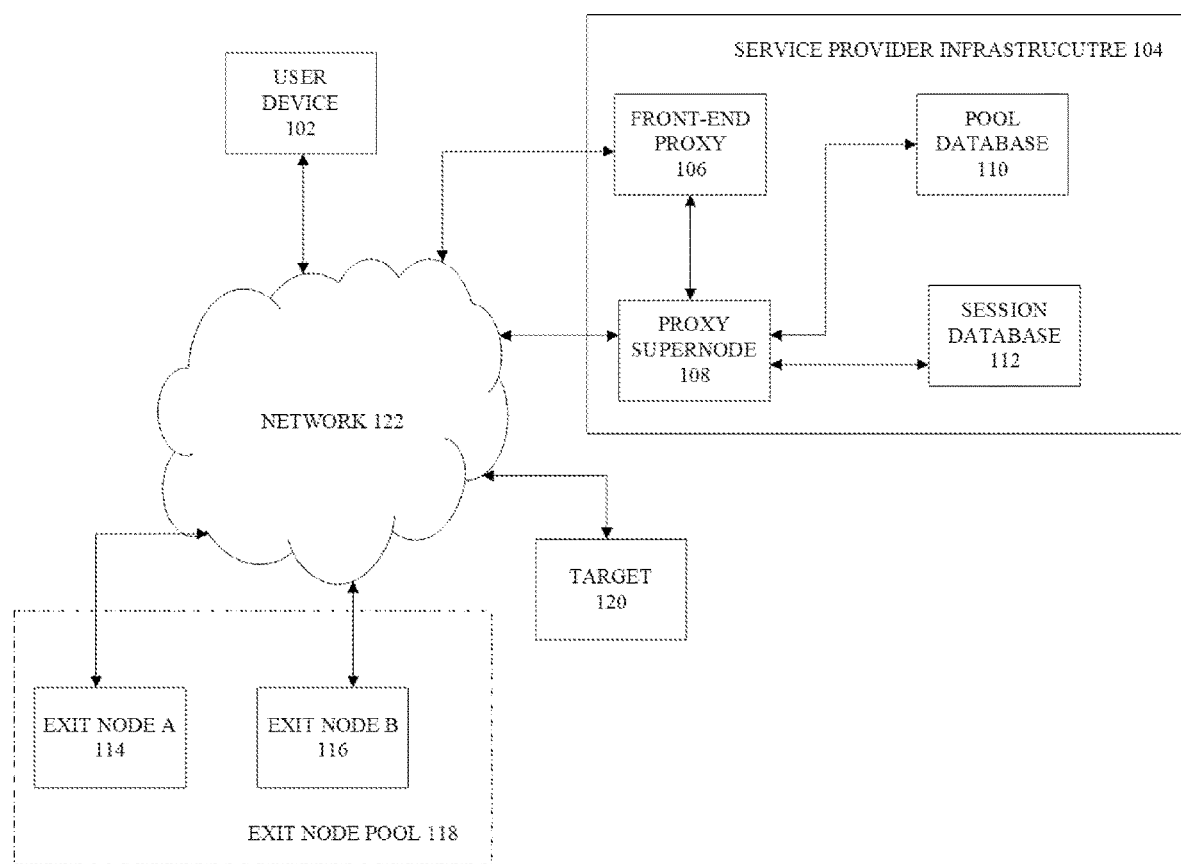

A detailed description of one or more exemplary embodiments is provided below, along with the accompanying figures that show the steps involved in the described embodiments. Numerous specific details are provided in the following description in order to provide a thorough understanding of the described embodiments, which may be implemented according to the claims without some or all of these specific details.

Some general terminology descriptions may be helpful and are included herein for convenience and are intended to be interpreted in the broadest possible interpretation.

User Device 102—where a user can be any person or a business entity requesting and using proxies for the purpose of obtaining relevant information from the Web (e.g., for the purpose of collecting information, scraping websites, etc.), a User Device 102 can be any device that is capable of making requests to the proxy, including any physical device that is connected to a network; including, for example, a laptop, a mobile phone, a tablet computer, or any other smart device. Additionally, it should be noted that the term "user" is being used in the interest of brevity and may refer to any of a variety of entities that may be associated with a subscriber account such as, for example, a person, an organization, an organizational role within an organization, a group within an organization, requesting and using proxy services to obtain relevant information from the web (e.g., scraping, streaming, etc.).

Service Provider Infrastructure 104—an infrastructure of the party providing the proxy as a service to the customer.

Service Provider Infrastructure 104 comprises of: Front-end Proxy 106, Pool Database 110, Session Database 112, and Proxy Supernode 108. In some embodiments, Proxy Supernode 108 can be situated in different geographical locations and outside the Service Provider Infrastructure 104. However, the overall functions of both Service Provider Infrastructure 104 and Proxy Supernode 108 remain unchanged. Nevertheless, by architectural design, Proxy Supernode 108 remains a part of Service Provider Infrastructure 104.

Front-end (FE) Proxy Server or front-end (FE) proxy 106—a proxy and a gateway providing interface into the Service Provider Infrastructure 104 for a User Device 102 or a group of User Devices 102. FE Proxy 106 is a constituent of the Service Provider Infrastructure 104 and can receive and forward requests from User Device 102 and send back the responses to User Devices 102 via Network 130. FE Proxy 106 may provide data caching services and serve User Device 102 with data stored in a local cache if the cached data is precisely the data requested by the user to control the bandwidth utilization at the exit node.

Proxy Supernode 108—a proxy server and a processing unit configured to perform several complex functions. Proxy Supernode 108 communicates and maintains connections with multiple exit nodes to service the user requests. Proxy Supernode 108 is configured to continuously monitor exit nodes' overall performances and report empirical data of exit nodes' performances to Session Database 112. Further, Proxy Supernode 108 is configured to periodically test, analyze and calculate exit nodes' quality rate individually. Proxy Supernode 108 can report quality rates of exit nodes to Pool Database 110. In addition to calculating quality rates, Proxy Supernode 108 computes available capacity for each exit node and reports the computed available capacity for each exit node to Pool Database 110. Proxy Supernode 108 is responsible for selecting and forwarding the request from User Device 102 to exit node(s) present in several pools of exit nodes based on exit nodes' quality rate and available capacity. In the embodiments disclosed herein, Proxy Supernode 108 is a constituent of Service Provider Infrastructure 104. Proxy Supernode 108 can be located in a different geographical location outside the Service Provider Infrastructure 104; however, the overall functions remain unchanged.

Pool Database 110—a memory storage that stores information about exit nodes according to their respective pools. Specifically, Pool Database 110 can contain data but are not limited to quality rates and available capacity values of each exit node classified according to their respective pools. Proxy Supernode 108 can populate, amend and retrieve the contents of Pool Database 110 regularly. Pool Database 110 is a part of Service Provider Infrastructure 104 and can be a physical storage unit or cloud-based storage.

Session Database 112—a memory storage that stores empirical data of multiple exit nodes. An exit node's empirical data can include, the detailed log of exit nodes' connection and disconnection from Proxy Supernode 108 along with their respective timestamps (disconnection chronology), instances of observed failures and/or corrupt responses before the present concurrency (P$\chi$) value reaches the maximum capacity ($C_{max}$) value, the present concurrency (P$\chi$) value, effective load, pool assignment timestamps, the total number of users serviced by the exit node. Proxy Supernode 108 populates and amends Session Database 112 with the aforementioned empirical data continually. Session Database 112 is a part of Service Provider Infrastructure 104 and can be a physical storage unit or cloud-based storage.

Exit Node A 114; Exit Node B 116; exit node(s)—an exemplary instance of proxies that are used to reach specific targets. In simple terms, exit node is the last gateway before the traffic reaches the target. Several proxy servers can be used to execute a user's request; however, exit node is the final proxy that contacts the target and retrieves data from the target. Exit nodes can be, for example, a laptop, a mobile phone, a tablet computer, or smart devices. Further on, exit nodes can also be a device, which is capable of network connectivity, but not primarily intended for networking, such as connected home appliances, smart home security systems, autonomous farming equipment, wearable health monitors, smart factory equipment, wireless inventory trackers, biometric cybersecurity scanners, shipping containers, and others. Exit nodes can be located in different geographical locations. The disclosure presents an exemplary system of such exit nodes, but the total number of exit nodes in the pool may vary according to the proxy service provider's infrastructure.

Exit Node Pool 118—an exemplary instance of a set of exit nodes that is being actively used for servicing requests from User Device 102. There can be an unlimited number of the exit nodes stored in the exit node pool.

Target 120; target(s)—an exemplary instance of a server serving any kind of media content, resources, information, services over the Internet or other network. Target can be, for example, a particular IP address, a domain name, and/or a hostname, possibly with a defined network protocol port, that represents a resource address at a remote system serving the content accessible through industry standard protocols. Target may be a physical or a cloud server that contains the content requested through the target address.

Network 122—is a digital telecommunications network that allows nodes to share and access resources. Examples of a network: local-area networks (LANs), wide-area networks (WANs), campus-area networks (CANs), metropolitan-area networks (MANs), home-area networks (HANs), Intranet, Extranet, Internetwork, Internet. In the current disclosure, the Internet is the most relevant Network for the functioning of the method.

Proxy service provider—a party providing the proxying functionality that is delivered to a user as a service composed of proxies, that act as an intermediary for requests from clients seeking resources from other servers, and the proxy management components. One of the many available typologies for proxy servers being the type of IP address the proxy uses, including but not limited to Residential IPs proxies, Datacenter IP proxies, and Mobile IPs proxies.

Quality rate; $Q_r$—a numerical value calculated and assigned to an individual exit node by Proxy Supernode 108. Quality rate ($Q_r$) is an aggregate criterion which is calculated by testing exit nodes periodically by various methods, and evaluating the responses to the aforementioned tests. In at least one exemplary instance in the current embodiment, the quality rating value for an exit node is calculated and assigned by evaluating at least the following—a) time taken by a particular exit node to perform a benchmark request to a specific target; b) latency while performing ping tests against a particular exit node; c) probability of a particular exit node's disconnections during the next ten minutes. Proxy Supernode 108 calculates the aforementioned probability by using the disconnection chronology of the particular exit node. In the current embodiment, Proxy Supernode 108 is configured by Service Provider Infrastructure 104 to calculate the probability of an exit node's disconnection during the next ten minutes. However, Service Provider Infrastructure 104 can decide through intelligent analysis the time period for which the aforementioned probability is calculated. More specifically, quality rate ($Q_r$) value, is calculated using an exemplary formula:

$$Q_r=(\min(\beta/a,0.5)+\min(\psi/b,0.5))\times(1-c)$$

where,
- $\beta$—benchmark threshold constant, denoting the ideal benchmark request speed (in milliseconds) of an exit node. Here, the value of $\beta$ is 100.
- $\psi$—ping threshold constant, denoting the ideal ping latency (in milliseconds) of an exit node. Here, the value of $\psi$ is 10.
- a—time taken (in milliseconds) by an exit node to perform a benchmark request to a specific target.
- b—latency (in milliseconds) while performing ping tests against an exit node.
- c—probability that an exit node will disconnect during the next ten minutes, calculated from the disconnection chronology of a particular exit node.

The min ( ) function in the above formula takes the minimum value of the given sets, such that the value of each set does not exceed the value of 0.5.

Additionally, in at least one exemplary instance in the current embodiment, quality rating values are assigned on a scale of 0-100; however, any alternative scale can be used to assign quality rating values.

Maximum capacity; $C_{max}$—a numerical value that denotes the maximum number of concurrent requests that can be executed successfully via a particular exit node. In other words, maximum capacity of an exit node is the total number of concurrent requests that the exit node can handle without failing or being blocked by the target. Here, the term "request" implies the full flow of data from User Device 102 via Service Provider Infrastructure 104 to an exit node and returning to the User Device 102. Service Provider infrastructure 104 can initially configure Proxy Supernode 108 to assign, based on intelligent analysis, a standard value of $C_{max}$ common for every exit node available with Proxy Supernode 108. However, through continuous monitoring of exit nodes' empirical data, if Proxy Supernode 108 detects the lowering success rates of a particular exit node, in that case, Proxy Supernode 108 can compute and assign a different maximum capacity ($C_{max}$) value for that particular exit node.

Present concurrency; $P\chi$—a numerical count which indicates the number of concurrent requests currently being executed by an exit node. Through continuous monitoring of exit node's performances, Proxy Supernode 108 records $P\chi$ value for each exit node.

Available capacity; $C_{avail}$—a numerical value computed by Proxy Supernode 108 for each exit node using the $C_{max}$ value and the present concurrency ($P\chi$) value. Specifically, $C_{avail}$ for an exit node is computed as:

$$C_{avail}=C_{max}-P\chi$$

In simple terms, an exit node's available capacity value indicates the available number of requests that can be executed concurrently without exceeding the maximum capacity value. Therefore, for an exit node, the available capacity value is always less than the maximum capacity value, i.e., $C_{avail}<C_{max}$. However, for a new exit node or an exit node with no active connections, the available capacity can be equal to the maximum capacity value, i.e., $C_{avail}=C_{max}$. Therefore, $C_{avail}$ is always $\leq C_{max}$.

Success rate—a percentage of user requests successfully executed by an exit node at every value of $P\chi$ (present concurrency value).

Minimum tolerance rate—a tolerated or a minimum percentage of success rate for every value of $P\chi$ (present concurrency value).

In one aspect, the present embodiments include a system and a method for effectively managing proxy service quality. Those of ordinary skill in the art will realize that the following detailed description of the present embodiments is illustrative only and is not intended to be in any way limiting. Other embodiments of the present system(s) and method(s) will readily suggest themselves to such skilled persons having the benefit of this disclosure. Reference will now be made in detail to implementations of the present embodiments as illustrated in the accompanying drawings. The same reference indicators will be used throughout the drawings and the following detailed description to refer to the same or like parts.

FIG. 1, shows an exemplary overall structure that comprises a User Device 102 which can be any computing device (e.g., a personal computer, mobile phone, a tablet computer) having access to Network 122, a Service Provider Infrastructure 104, Exit Node A 114, Exit Node B 116, and Target 120. Service Provider Infrastructure 104 contains FE Proxy 106, Proxy Supernode 108, Pool Database 110, and Session Database 112.

In FIG. 1, Network 122 can be local-area networks (LANs), wide-area networks (WANs), campus-area networks (CANs), metropolitan-area networks (MANs), home-area networks (HANs), Intranet, Extranet, Internetwork, Internet. In the current disclosure, the Internet is the most relevant Network for the functioning of the method. While the elements shown in the FIG. 1 implement an exemplary embodiment, some elements in other embodiments can have different titles or can be combined into a single element instead of two separate elements (for example, Pool Database 110 and Session Database 112 can be co-located as single element. Likewise, FE Proxy 106 and Proxy Supernode 108 can be combined together as a single element.) However, the functionality of elements and the flow of information between the elements is not impacted generally by such combinations or consolidations. Therefore, FIG. 1 as shown should be interpreted as exemplary only, and not restrictive or exclusionary of other features, including features discussed in other areas of this disclosure.

Within the Service Provider Infrastructure 104, FE Proxy 106 and Proxy Supernode 108 can communicate with each other, while Proxy Supernode 108 can access Pool Database 110 and Session Database 112. Furthermore, in Service Provider Infrastructure 104, FE Proxy 106 can communicate with an outside element, namely, the User Device 102. Likewise, Proxy Supernode 108 can communicate with outside elements, namely, Exit Node A 114, Exit Node B 116. User Device 102, Service Provider Infrastructure 104, Exit Node A 114, Exit Node B 116, and Target 120 have access to Network 122 and communicate with each other through the same. In FIG. 1, all communication occurrences between the elements occur through standard network communication protocols such as, but not limited to, TCP/IP, UDP, SOCKS 5.

In FIG. 1, the User Device 102 initially sends a request for data extraction to Service Provider Infrastructure 104 via Network 122. The request from User Device 102 is received by FE Proxy 106 in the Service Provider Infrastructure 104. Here, FE Proxy 106 acts as an entry point for User Device 102 into the Service Provider Infrastructure 104. Additionally, the request from User Device 102 may include verification credentials for user validation and requirements for exit node pool selection. The requirements can include several parameter metrics but are not limited to exit node geo-location, ability to reach specific targets, and latency.

Upon receiving the request from User Device 102, FE Proxy 106 forwards the request to Proxy Supernode 108, which checks the request and chooses a suitable exit node pool by accessing the Pool Database 110. After choosing a suitable pool, Proxy Supernode 108 retrieves and checks the metadata of exit nodes belonging to the chosen exit node pool. The retrieved metadata contains the quality rates ($Q_r$) and available capacity ($C_{avail}$) values of each exit node in the respective pool. Proxy Supernode 108 analyzes the retrieved metadata to select an exit node to service the user request. In one of the embodiments, from the retrieved metadata, Proxy Supernode 108 identifies the exit nodes with greater than zero available capacity ($C_{avail}$) values, i.e., $C_{avail}>0$. After which, Proxy Supernode 108 arranges the identified exit nodes according to their respective quality rating ($Q_r$) values in a descending order, i.e., beginning with the highest $Q_r$ value. By identifying and arranging the exit nodes with available capacity ($C_{avail}$) values greater than zero, Proxy Supernode 108 can isolate the exit nodes with zero available capacity ($C_{avail}$) values. Proxy Supernode 108 selects an exit node with the highest quality rate ($Q_r$) value from the arranged list of exit nodes. If there are multiple exit nodes with the highest quality rate ($Q_r$) value, then Proxy Supernode 108 selects an exit node with the highest quality rate ($Q_r$) values at random.

When a new request from another User Device 102 occurs, Proxy Supernode 108 can again select the previously selected exit node with the highest quality rate ($Q_r$) if the available capacity ($C_{avail}$) value is still greater than zero. If $C_{avail}=0$ for an exit node, it indicates that the number of exit node's concurrent requests has reached its maximum limit and can no longer execute further requests.

After selecting the exit node, Proxy Supernode 108 forwards the request for data extraction to the respective exit node, which in turn forwards the request to the intended target. Thus, through the current embodiment, Service Provider Infrastructure 104 is able to select an exit node to utilize to its fullest capacity without failing or being blocked by the target.

In another embodiment, after choosing a suitable exit node pool and retrieving the metadata of exit nodes belonging to the chosen exit node pool, Proxy Supernode 108 selects an exit node with the highest quality rate ($Q_r$) and the highest available capacity ($C_{avail}$) value. In case of a new request from another User Device 102, Proxy Supernode 108 can still select the previously selected exit node with the highest quality rate ($Q_r$) if the available capacity value ($C_{avail}$) is greater than zero. If $C_{avail}=0$ for an exit node, it indicates that the number of exit node's concurrent requests has reached its maximum and additional requests are not sent to the exit node.

If the available capacity value ($C_{avail}$) for the particular exit node with the highest quality rate ($Q_r$) is zero, Proxy Supernode 108 chooses another exit node with the second highest quality rate ($Q_r$) and a non zero available capacity value ($C_{avail}$). After selecting the exit node, Proxy Supernode 108 forwards the request for data extraction to the respective exit node, which in turn forwards the request to the intended target. Thus, through the current embodiment, Service Provider Infrastructure 104 is enabled to select an exit node to utilize to its fullest capacity without failing or being blocked by the target.

In yet another aspect, in FIG. 1, Proxy Supernode 108 continuously monitors overall performances of multiple exit nodes belonging to several pools. Further, Proxy Supernode 108 reports empirical data on each exit nodes' performances to Session Database 112. The empirical data can contain, but is not limited to, disconnection chronology, instances of observed failures and or corrupt responses before reaching maximum capacity ($C_{max}$) value, present concurrency (Pχ), effective load, pool assignment timestamps and the total number of users serviced by the exit node. Proxy Supernode 108 computes an available capacity ($C_{avail}$) value for each exit node by accessing the empirical data from Session Database 112. Consequently, Proxy Supernode 108 reports the available capacity ($C_{avail}$) value of each exit node to the Pool Database 110.

However, if the success rate declines below the minimum tolerance rate for a particular exit node or exit nodes, Proxy Supernode 108 can detect the decline in the success rate for a particular exit node or exit nodes and can re-compute and assign a different maximum capacity ($C_{max}$) value for the particular exit node or exit nodes so that the success rate for the aforementioned exit nodes remains higher than the minimum tolerance value.

Additionally, Proxy Supernode 108 periodically tests each exit node belonging to several pools. The testing of exit nodes is carried out through, but is not limited to, benchmark requests and ping messages. Proxy Supernode 108 can send benchmark requests to exit nodes, wherein the requests are intended for one target or several different targets. The targets are dynamically determined internally by Proxy Supernode 108. Proxy Supernode 108 can monitor and register several parameter metrics of exit nodes, including, but not limited to: time taken to reach a specific target, number of hops to reach the exit node, availability, and latency while performing ping tests.

Through testing the exit nodes, Proxy Supernode 108 obtains and analyzes the responses provided by the exit nodes to calculate their quality rate ($Q_r$). While calculating the quality rate ($Q_r$) for each exit node, Proxy Supernode 108 uses the values of a) time taken (in milliseconds) by a particular exit node to perform a benchmark request to a specific target; b) latency (in milliseconds) while performing ping test on a particular exit node; c) probability of a particular exit node's disconnections during the next ten minutes, calculated from the disconnection chronology of the particular exit node. More specifically, quality rate ($Q_r$) value, is calculated using an exemplary formula:

$$Q_r=(\min(\beta/a,0.5)+\min(\psi/b,0.5))\times(1-c)$$

In the current embodiment, quality rate ($Q_r$) values are assigned on a scale of 0-100. The method and the mathematical formula for quality rate calculation is initially configured into Proxy Supernode 108 by Service Provider Infrastructure 104. After calculating the quality rates of exit nodes, Proxy Supernode 108 reports each exit node's quality rate to the Pool Database 110.

Figure 2A:
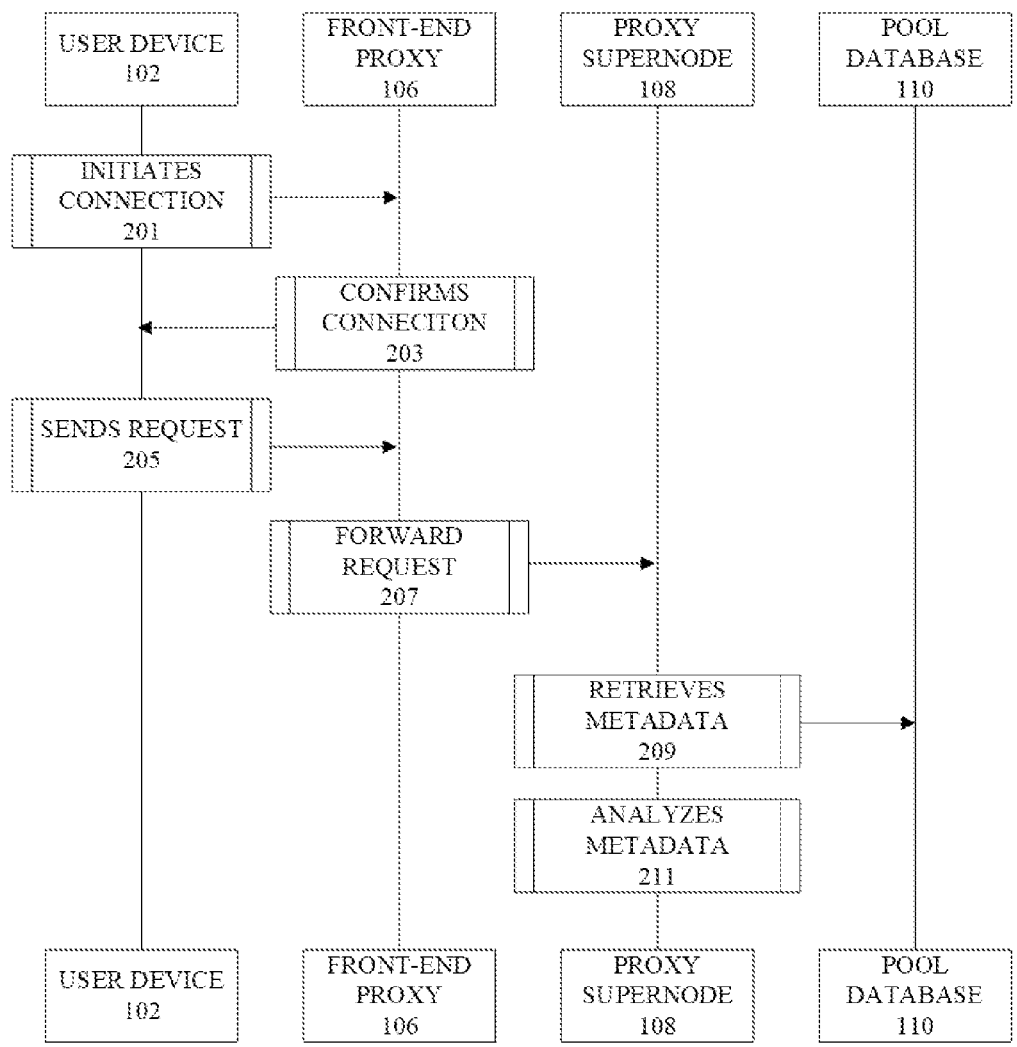
FIG. 2A is an exemplary flow diagram showing the selection of an exit node to route requests of data extraction from a User Device 102.

FIG. 2A represents an exemplary flow diagram showing the selection of an exit node to route requests for data extraction from the User Device 102. In step 201, User Device 102 initiates a connection with FE Proxy 106 present in the Service Provider Infrastructure 104. Responding to the initiation request from User Device 102, in step 203, FE Proxy 106 confirms the connection with User Device 102, thereby establishing the connection. There can be more messages exchanged as part of initiating and establishing the connection according to communication protocols' standards. The embodiment can employ several communication protocols, including, but not limited to, TCP, UDP and SOCKS 5. However, this does not change the overall functioning detailed herewithin. Step 201 and 203 are meant to include all steps necessary to establish a connection between User Device 102 and FE Proxy 106, based on the employed communication protocol.

After establishing the connection between User Device 102 and FE Proxy 106, in step 205, User Device 102 sends a request for data extraction intended for a specific target towards FE Proxy 106. Together with the request for data extraction, User Device 102 can send requirements for exit node pool selection, and verification credentials for user validation carried out at Proxy Supernode 108. Verification credentials can include, but are not limited to, user identifications, passwords, hash identifications, serial numbers and PINs. FE Proxy 106 receives the request for data extraction from User Device 102 and, in step 207, forwards the request to Proxy Supernode 108 present within the Service Provider Infrastructure 104. In some embodiments, FE Proxy 106 can add session identification to the request received from User Device 102 before forwarding the request to Proxy Supernode 108. Session identification can be generated and assigned to ensure a session's association with the context of the same User Device 102. Here, the term session generally refers to temporary and interactive data exchange between the User Device 102 and the Service Provider Infrastructure 106.

Proxy Supernode 108 receives the request for data extraction from FE Proxy 106. Proxy Supernode 108 can carry out the user validation by verifying the credentials sent along with the request against the data from an internal database within Proxy Supernode 108 or an external database. Once user validation is successful, Proxy Supernode 108 checks the request to evaluate the requirements for exit node pool selection that are sent with the request. Requirements can include several attributes such as, but not limited to, exit node geo-location, ability to reach specific targets, and latency. After checking the request, Proxy Supernode 108 accesses the Pool Database 110 to select a suitable exit node pool in order to satisfy the requirements sent with the request. If the requirements for exit node pool selection is absent, Proxy Supernode 108 can select a suitable exit node pool randomly.

After choosing a suitable exit node pool, Proxy Supernode 108, in step 209, retrieves the metadata of exit nodes belonging to the chosen pool, from Pool Database 110. The metadata retrieved from Pool Database 110 contains information regarding exit nodes available in the particular pool. Metadata includes, but is not limited to, an IP address of each exit node, geo-location of each exit node, quality rates ($Q_r$) values and available capacity ($C_{avail}$) values for each exit node. Promptly after, in step 211, Proxy Supernode 108 analyzes the retrieved metadata. Specifically, Proxy Supernode 108 identifies exit nodes with greater than zero available capacity ($C_{avail}$) values (i.e., $C_{avail}$>0).

Figure 2B:
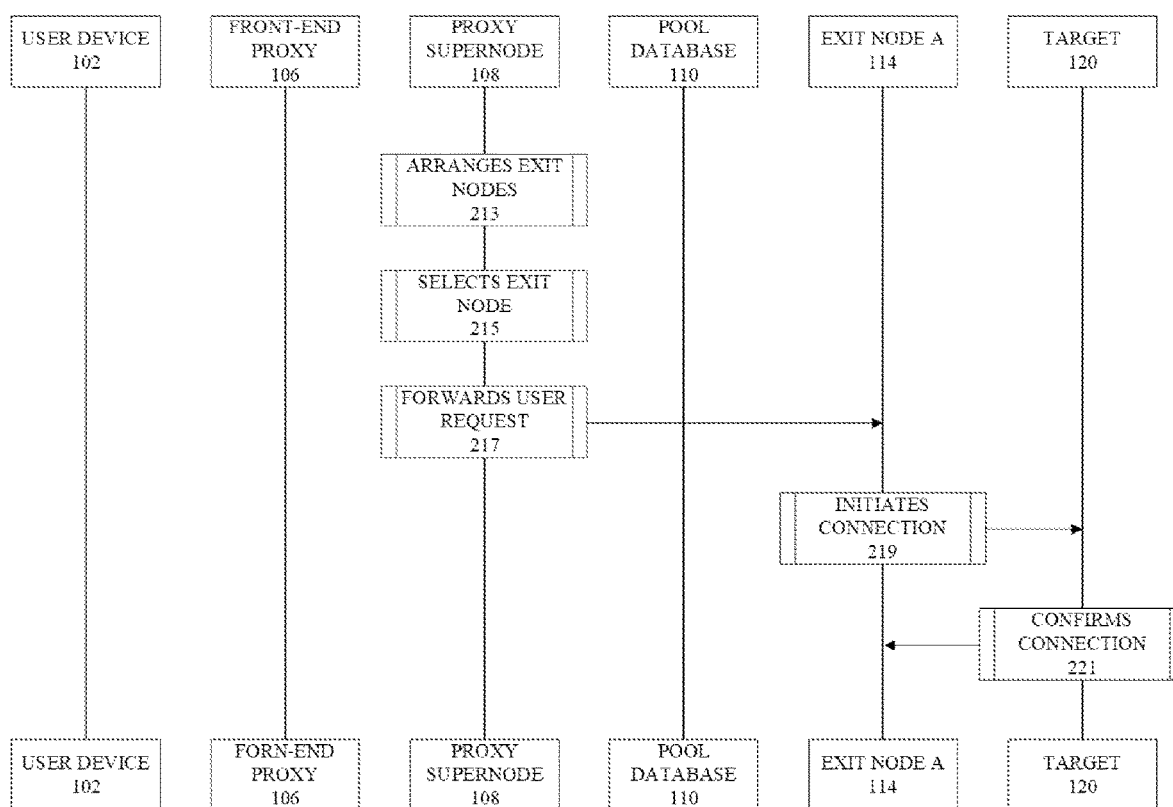
FIG. 2B is the continuation of an exemplary flow diagram showing the selection of an exit node to route requests of data extraction from the User Device 102.

FIG. 2B is the continuation of an exemplary flow diagram showing the selection of an exit node to route requests for data extraction from the User Device 102. After analyzing the metadata and identifying the exit nodes with greater than zero available capacity ($C_{avail}$) values, in step 213 Proxy Supernode 108 proceeds to arrange the identified exit nodes according to their quality rate ($Q_r$) values in a descending order, i.e., beginning with the highest $Q_r$ value. By identifying and arranging the exit nodes with greater than zero available capacity ($C_{avail}$) values, Proxy Supernode 108 can isolate the exit nodes with zero available capacity ($C_{avail}$) values, thereby avoiding the selection of exit nodes that have reached the maximum limit in executing concurrent requests. As noted above, exit nodes with $C_{avail}$=0 indicates that the number of exit node's concurrent requests has reached its maximum limit and can no longer execute further requests.

In step 215, Proxy Supernode 108 selects an exit node with the highest quality rate ($Q_r$) value from the arranged list of exit nodes. If there are multiple exit nodes with the highest quality rate ($Q_r$) value, then Proxy Supernode 108 selects an exit node with the highest quality rate ($Q_r$) values at random.

In step 217, Proxy Supernode 108 forwards the request for data extraction to the selected exit node (represented by Exit Node A 114). In step 219, after receiving the request from Proxy Supernode 108, Exit Node A 114 initiates a connection with Target 120. Consequently, in step 221, Target 120 confirms the connection, thereby establishing the connection with Exit Node A 114. There can be more messages exchanged as part of initiating and establishing the connection according to communication protocols' norms. Step 219 and 221 are meant to include all steps necessary to establish a connection between Exit Node A 114 and Target 120, based on the employed communication protocol.

Figure 2C:
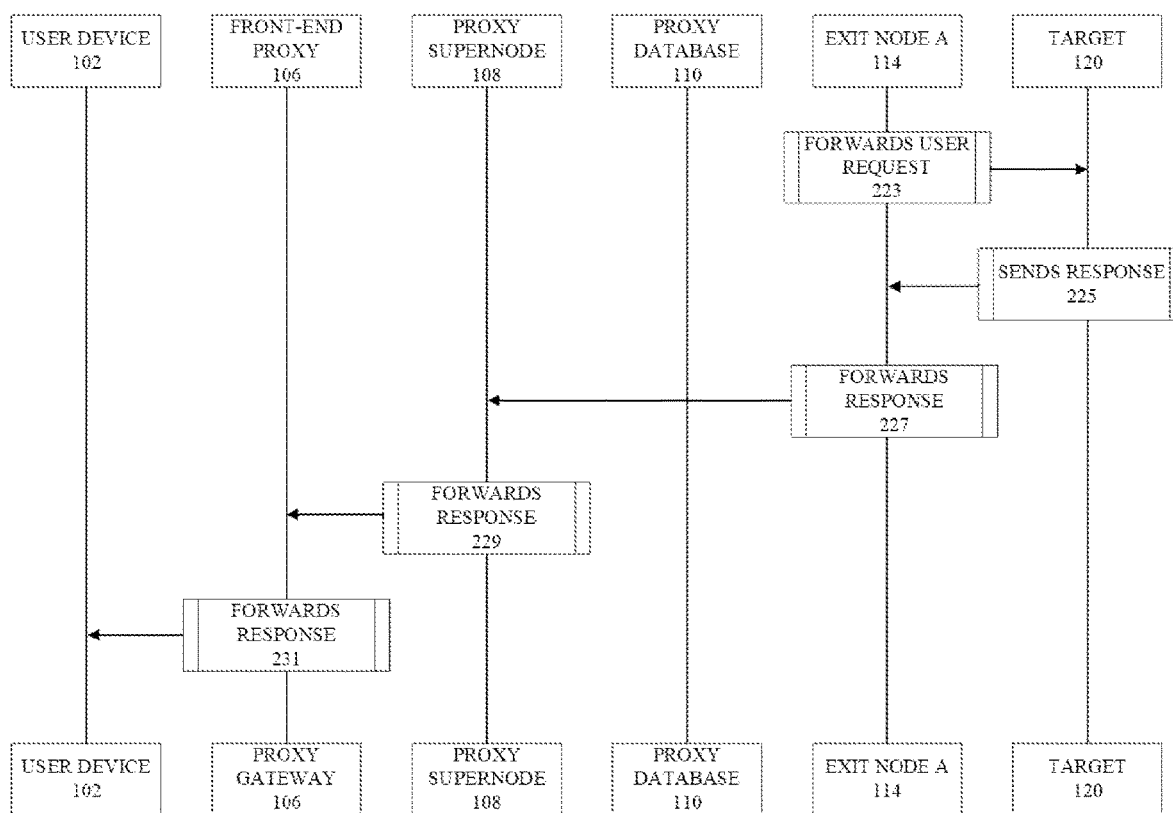
FIG. 2C is the continuation of an exemplary flow diagram showing the selection of an exit node to route requests of data extraction from the User Device 102.

FIG. 2C is the continuation of an exemplary flow diagram showing the selection of an exit node to route requests for data extraction from the User Device 102. After establishing the connection, in step 223 Exit Node A 114 forwards the request for data extraction to the Target 120. Subsequently, in step 225 the Target 120 responds to the request by providing the necessary information/data as a response to the request. In step 227, after receiving the response from Target 120, the Exit Node A 114 forwards the response to Proxy Supernode 108. In step 229, Proxy Supernode 108 forwards the received response to FE Proxy 106. Finally, in step 231 after receiving the response from Proxy Supernode 106, FE Proxy 106 forwards the response to User Device 102.

Figure 3A:
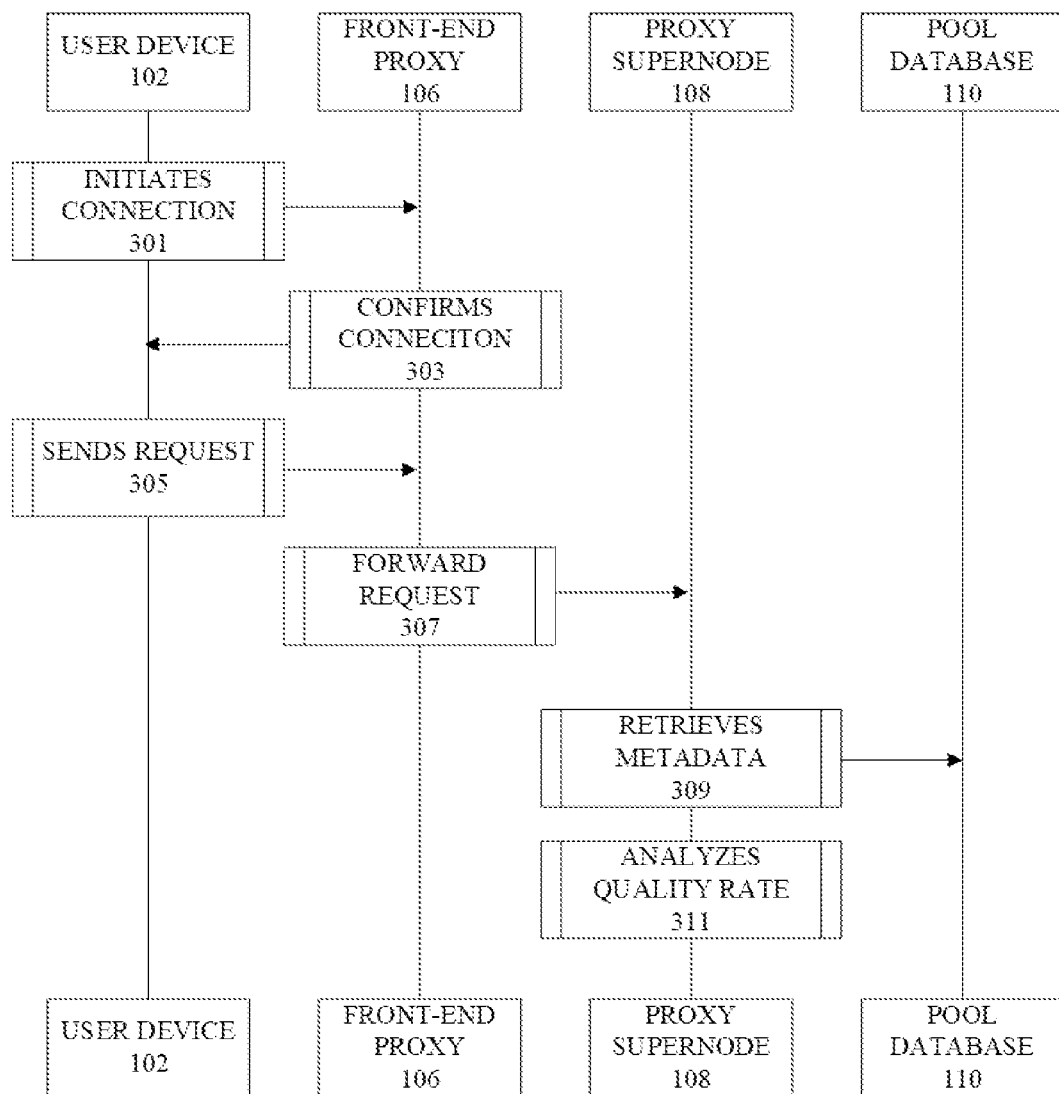
FIG. 3A represents an exemplary flow diagram showing the selection of an exit node with the highest quality rate ($Q_r$) value and the highest available capacity ($C_{avail}$) to route requests for data extraction from the User Device 102.

FIG. 3A represents an exemplary flow diagram showing the selection of an exit node with the highest quality rate ($Q_r$) value and the highest available capacity ($C_{avail}$) to route requests for data extraction from the User Device 102. In step 301, User Device 102 initiates a connection with FE Proxy 106 present in the Service Provider Infrastructure 104. Responding to the initiation request from User Device 102, in step 303, FE Proxy 106 confirms the connection with User Device 102, thereby establishing the connection. There can be more messages exchanged as part of initiating and establishing the connection according to communication protocols' standards. The embodiment can employ several communication protocols, including, but not limited to, TCP, UDP and SOCKS 5. However, this does not change the overall functioning of the embodiments. Step 301 and 303 are meant to include all steps necessary to establish a connection between User Device 102 and FE Proxy 106, based on the employed communication protocol.

After establishing the connection between User Device 102 and FE Proxy 106, in step 305, User Device 102 sends a request for data extraction intended for a specific target towards FE Proxy 106. Together with the request for data extraction, User Device 102 can send requirements for exit node pool selection, and verification credentials for user validation carried out at Proxy Supernode 108. Verification credentials can include, but are not limited to, user identifications, passwords, hash identifications, serial numbers and PINs. FE Proxy 106 receives the request for data extraction from User Device 102 and, in step 307, forwards the request to Proxy Supernode 108 present within the Service Provider Infrastructure 104. In some embodiments, FE Proxy 106 can add session identification to the request received from User Device 102 before forwarding the request to Proxy Supernode 108. Session identification can be generated and assigned to ensure a session's association with the context of the same User Device 102. Here, the term session generally refers to temporary and interactive data exchange between the User Device 102 and the Service Provider Infrastructure 106.

Proxy Supernode 108 receives the request for data extraction from FE Proxy 106. Proxy Supernode 108 can carry out the user validation by verifying the credentials sent along with the request against the data from an internal database within Proxy Supernode 108 or an external database. Once user validation is successful, Proxy Supernode 108 checks the request to evaluate the requirements for exit node pool selection that are sent with the request. Requirements can include several attributes such as, but not limited to, exit node geo-location, ability to reach specific targets, and latency. After checking the request, Proxy Supernode 108 accesses the Pool Database 110 to choose a suitable exit node pool in order to satisfy the requirements sent with the request. If the requirements for exit node pool selection is absent, Proxy Supernode 108 can select a suitable exit node pool randomly.

After choosing a suitable exit node pool, Proxy Supernode 108, in step 309, retrieves the metadata of exit nodes belonging to the chosen pool, from Pool Database 110. The metadata retrieved from Pool Database 110 contains information regarding exit nodes available in the particular pool. Metadata includes, but is not limited to, IP address of each exit node, geo-location of each exit node, quality rates ($Q_r$) values and available capacity ($C_{avail}$) values for each exit node. Promptly after, in step 311, Proxy Supernode 108 analyzes the quality rate ($Q_r$) value for each exit node.

Figure 3B:
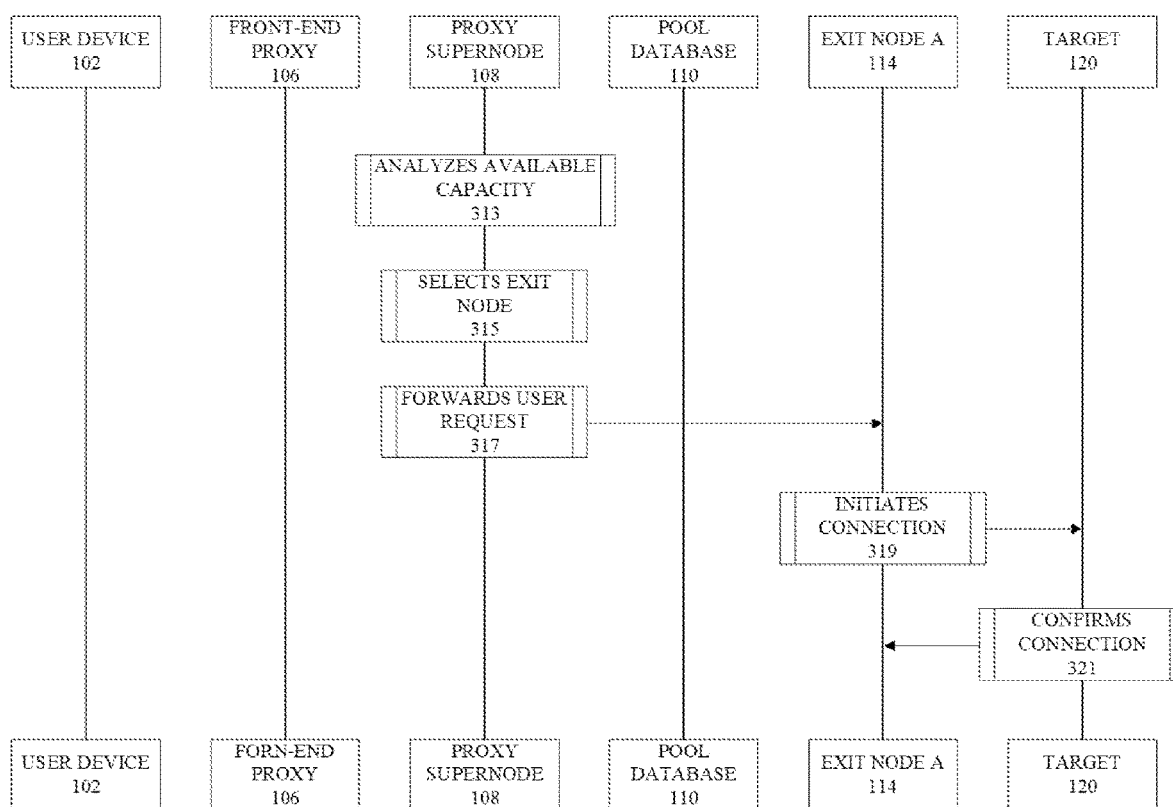
FIG. 3B is the continuation of an exemplary flow diagram showing the selection of an exit node with the highest quality rate ($Q_r$) value and the highest available capacity ($C_{avail}$) to route requests for data extraction from the User Device 102.

FIG. 3B is the continuation of an exemplary flow diagram showing the selection of an exit node with the highest quality rate ($Q_r$) value and the highest available capacity ($C_{avail}$) to route requests for data extraction from the User Device 102. After analyzing the quality rate, in step 313 Proxy Supernode 108 proceeds to analyze the available capacity value ($C_{avail}$) for each exit node provided by the pool database. In step 315 Proxy Supernode 108 identifies and selects an exit node with the highest quality rate ($Q_r$) value and the highest available capacity value ($C_{avail}$) that is suitable to implement the user request. Generally, it is not technically feasible to ensure the exit nodes provided possess both the highest $Q_r$ and $C_{avail}$ values. The exit node with the highest quality rate value ($Q_r$) can also have the lowest capacity ($C_{avail}$) value or even zero capacity ($C_{avail}$) value. Therefore, Proxy Supernode 108 ensures that the available capacity ($C_{avail}$) value for the chosen exit node is greater than zero. Also, if the exit node with the highest quality rate value has the lowest capacity value ($C_{avail}$), Proxy Supernode 108 selects another exit node with the second highest quality rate value ($Q_r$) and possibly with the second-highest available capacity ($C_{avail}$) value. If such an exit node is not available, Proxy Supernode 108 selects another exit node with the third highest quality rate ($Q_r$) and with greater than zero available capacity ($C_{avail}$) value.

Thus, after the manner described above, Proxy Supernode 108 selects an exit node from the chosen pool of exit nodes. In step 317, Proxy Supernode 108 forwards the request for data extraction to the selected exit node (represented by Exit Node A 114). In step 319, after receiving the request from Proxy Supernode 108, Exit Node A 114 initiates a connection with Target 120. Consequently, in step 321, Target 120 confirms the connection, thereby establishing the connection with Exit Node A 114. There can be more messages exchanged as part of initiating and establishing the connection according to communication protocols' norms. Step 319 and 321 are meant to include all steps necessary to establish a connection between Exit Node A 114 and Target 120, based on the employed communication protocol.

Figure 3C:
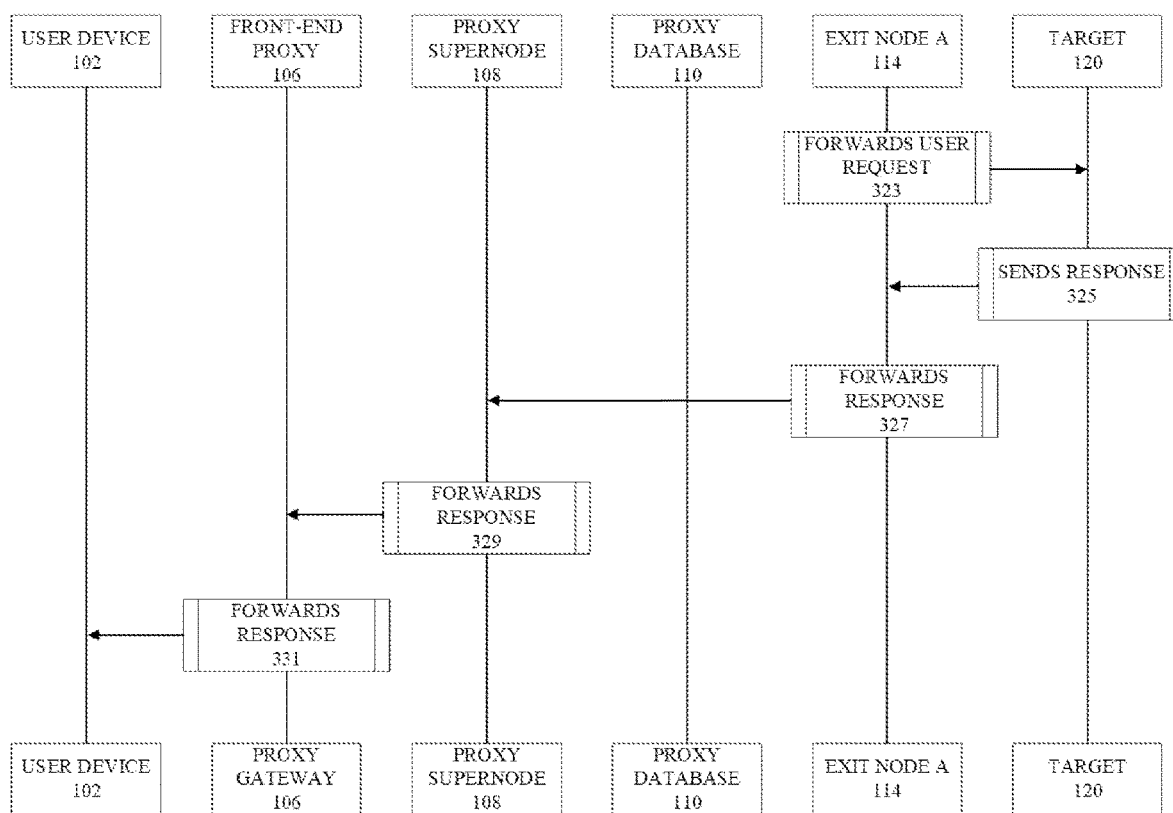
FIG. 3C is the continuation of an exemplary flow diagram showing the selection of an exit node with the highest quality rate ($Q_r$) value and the highest available capacity ($C_{avail}$) to route requests for data extraction from the User Device 102.

FIG. 3C is the continuation of an exemplary flow diagram showing the selection of an exit node to route requests for data extraction from the User Device 102. After establishing the connection, in step 323 Exit Node A 114 forwards the request for data extraction to the Target 120. Subsequently, in step 325 the Target 120 responds to the request by providing the necessary information/data as a response to the request. In step 327 after receiving the response from Target 120, the Exit Node A 114 forwards the response to Proxy Supernode 108. In step 329, Proxy Supernode 108 forwards the received response to FE Proxy 106. Finally, in step 331 after receiving the response from Proxy Supernode 106, FE Proxy 106 forwards the response to User Device 102.

Figure 4:
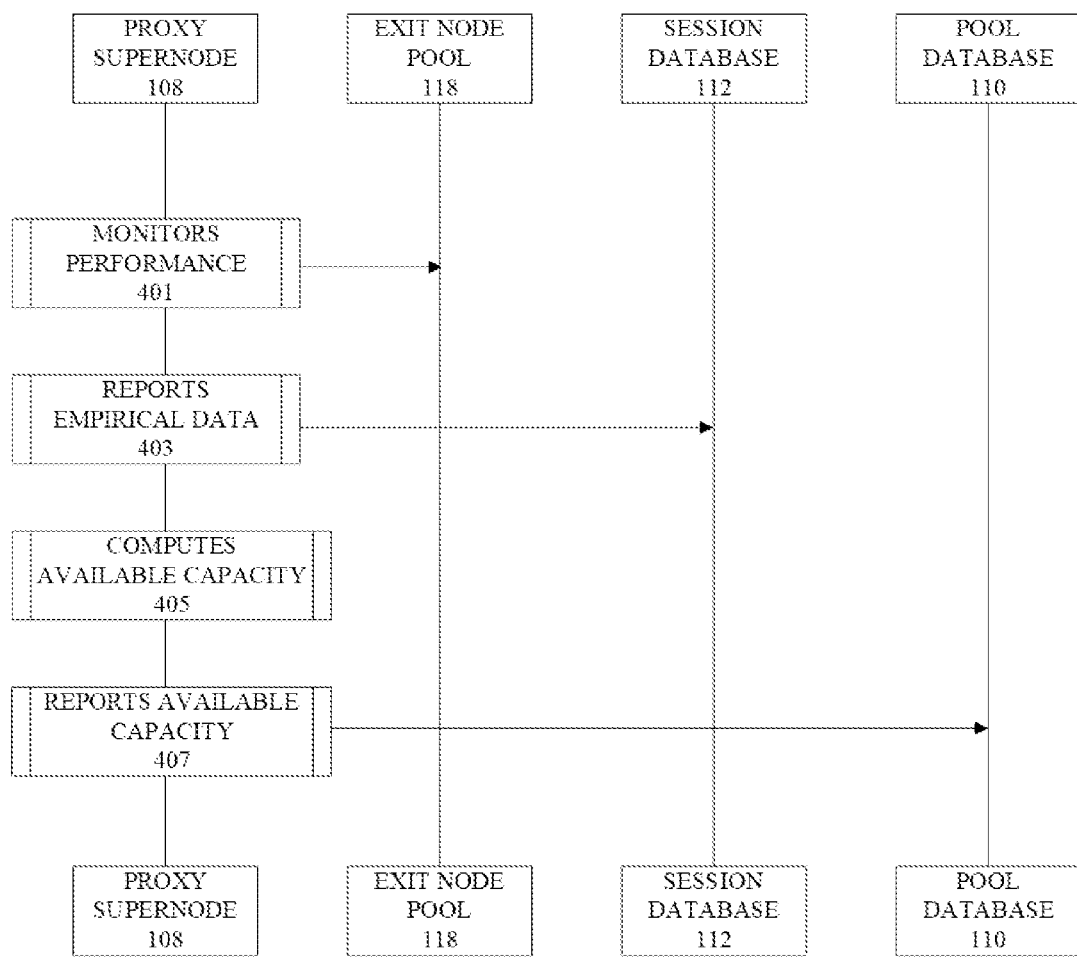
FIG. 4 is an exemplary flow diagram showing the steps involved in computing available capacity ($C_{avail}$) values for exit nodes.

In another embodiment, Proxy Supernode computes available capacity ($C_{avail}$) values for each exit node by continuously monitoring the present number of concurrent requests executed by that exit node. FIG. 4 is an exemplary flow diagram showing the steps involved in computing available capacity ($C_{avail}$) values for exit nodes. In step 401, Proxy Supernode 108 monitors the overall performance of each exit node present in the Exit Node Pool 118. The flow diagram shows only an instance of such operations, but Proxy Supernode 108 can concurrently monitor performance of multiple exit nodes', possibly belonging to multiple exit node pools.

Further, while constantly monitoring exit nodes' overall performances, in step 403, Proxy Supernode 108 reports empirical data of each exit node to Session Database 112 regularly. Empirical data can include, but is not limited to: present concurrency ($P\chi$) value, disconnection chronology, success rate, instances of observed failures and/or corrupt responses before reaching maximum capacity value, effective load, pool assignment timestamps, the total number of users serviced by the exit node. In step 405, Proxy Supernode 108 proceeds to compute available capacity ($C_{avail}$) value for each exit node by utilizing the present concurrency values ($P\chi$) of exit nodes. The present concurrency is a numerical count, which indicates the number of concurrent requests currently being executed by an exit node. Proxy Supernode 108 computes available capacity ($C_{avail}$) as:

$$C_{avail} = C_{max} - P\chi$$

In the current embodiment, $C_{max}$ or maximum capacity value denotes the maximum number of concurrent requests that can be executed successfully via a particular exit node. Here, the term "request" implies the full flow of data from User Device 102 via Service Provider Infrastructure 104 to an exit node and returning to the User Device 102. Initially, Service Provider infrastructure 104 can configure Proxy Supernode 108 to assign, based on intelligent analysis, a common value of $C_{max}$ to every exit node known by Proxy Supernode 108. For instance, $C_{max}$ can be assigned as twelve for every exit node known by Proxy Supernode 108. $C_{max}=12$ implies that exit nodes can execute twelve concurrent requests successfully. However, if, through continuous monitoring of exit nodes' empirical data, Proxy Supernode 108 detects the lowering success rates of a particular exit node, Proxy Supernode 108 can compute and assign a different maximum capacity ($C_{max}$) value for that particular exit node.

By calculating the available capacity ($C_{avail}$) value for each exit node, Proxy Supernode 108 can determine the number of requests that can still be executed concurrently by each exit node while avoiding potential failures or being blocked by the target. Therefore, after computing available capacity ($C_{avail}$) values, in step 407 Proxy Supernode 108 reports the computed available capacity ($C_{avail}$) values for each exit node according to their pool classification to Pool Database 110.

Figure 5:
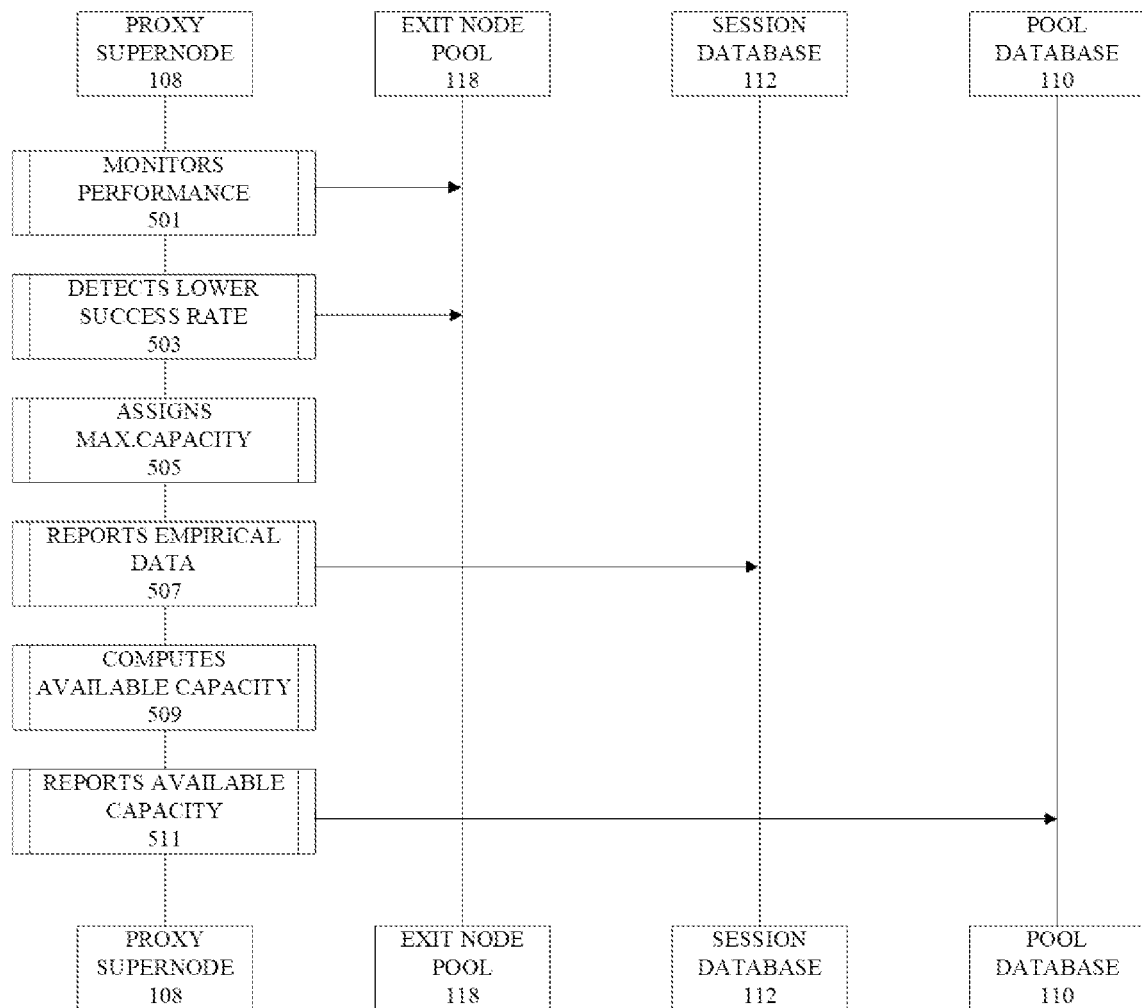
FIG. 5 is an exemplary flow diagram showing the steps involved in assigning a different maximum capacity ($C_{max}$) value and computing available capacity ($C_{avail}$) values for exit nodes.

FIG. 5 is an exemplary flow diagram showing the steps involved in assigning a different maximum capacity ($C_{max}$) value and computing available capacity ($C_{avail}$) values for particular exit nodes. In step 501, Proxy Supernode 108 monitors the overall performance of each exit node present in the Exit Node Pool 118. The flow diagram shows only an instance of such an operation but Proxy Supernode 108 can concurrently monitor the performance of multiple exit nodes belonging to several exit node pools. Moreover, as part of the monitoring procedure in step 501, Proxy Supernode 108 can calculate and ensure that each exit node's success rate is higher than the minimum tolerance rate. Here, the minimum tolerance rate denotes a tolerated or a minimum percentage of success rate for every value of $P\chi$ (present concurrency value).

Service Provider infrastructure 104 initially can configure Proxy Supernode 108 to assign, based on intelligent analysis, a common value for the minimum tolerance rate for every exit node that is available with the Proxy Supernode 108. Proxy Supernode 108 calculates success rate for each $P\chi$ value (present concurrency values) of exit nodes. Proxy Supernode 108 ensures that the success rate at every $P\chi$ value is higher than the minimum tolerance rate.

However, if the success rate for certain exit nodes is lower than the minimum tolerance rate, in step 503, Proxy Supernode 108 detects and identifies the exit node with the declined success rate, i.e., success rate lower than the minimum tolerance rate. Consequently, in step 505, Proxy Supernode 108 determines and assigns a different maximum capacity ($C_{max}$) value (by lowering the original one to some degree) of the particular exit node such that the success rate remains higher than the minimum tolerance rate. This is done by lowering the $C_{max}$ value to a specific $P\chi$ value in which the success rate of the exit node is higher than the minimum tolerance rate. Proxy Supernode 108 uses its internal memory for storing the maximum capacity ($C_{max}$) value of every exit node in. Proxy Supernode 108 can update its internal memory with the changed maximum capacity ($C_{max}$) values for certain exit nodes at any time.

Further, while constantly monitoring exit nodes' overall performances, in step 507 Proxy Supernode 108 reports empirical data of each exit node to Session Database 112 regularly. Empirical data can include, but is not limited to: present number of concurrent requests, disconnection chronology, success rates, instances of observed failures and or corrupt responses before reaching maximum capacity value, effective load, pool assignment timestamps, the total number of users serviced by the exit node.

In step 509, Proxy Supernode 108 proceeds to compute available capacity ($C_{avail}$) for each exit node by utilizing the present concurrency values ($P\chi$) of each exit node. The present number of concurrent requests is a numerical count, which indicates the number of concurrent requests currently being executed by an exit node. Proxy Supernode 108 computes available capacity ($C_{avail}$) as:

$$C_{avail} = C_{max} - P\chi$$

In the current embodiment $C_{max}$, or maximum capacity value, denotes the maximum number of concurrent requests that can be executed successfully via a particular exit node. Here, the term "request" implies the full flow of data from User Device 102 via Service Provider Infrastructure 104 to an exit node and returning to the User Device 102. Initially, Service Provider infrastructure 104 can configure Proxy Supernode 108 to assign, based on intelligent analysis, a common value of $C_{max}$ for every exit node available with Proxy Supernode 108. However, through continuous monitoring of exit nodes' empirical data, if Proxy Supernode 108 detects lowering success rates of a particular exit node, in that case, Proxy Supernode 108 can compute and assign a different maximum capacity ($C_{max}$) value for that particular exit node.

By calculating the available capacity ($C_{avail}$) values for each exit node, Proxy Supernode 108 can determine the number of requests that can be still executed by each exit node without potential failures. Therefore, after computing available capacity values ($C_{avail}$), in step 511 Proxy Supernode 108 reports the computed available capacity ($C_{avail}$) values for each exit node according to their pool classification to Pool Database 110.

Figure 6:
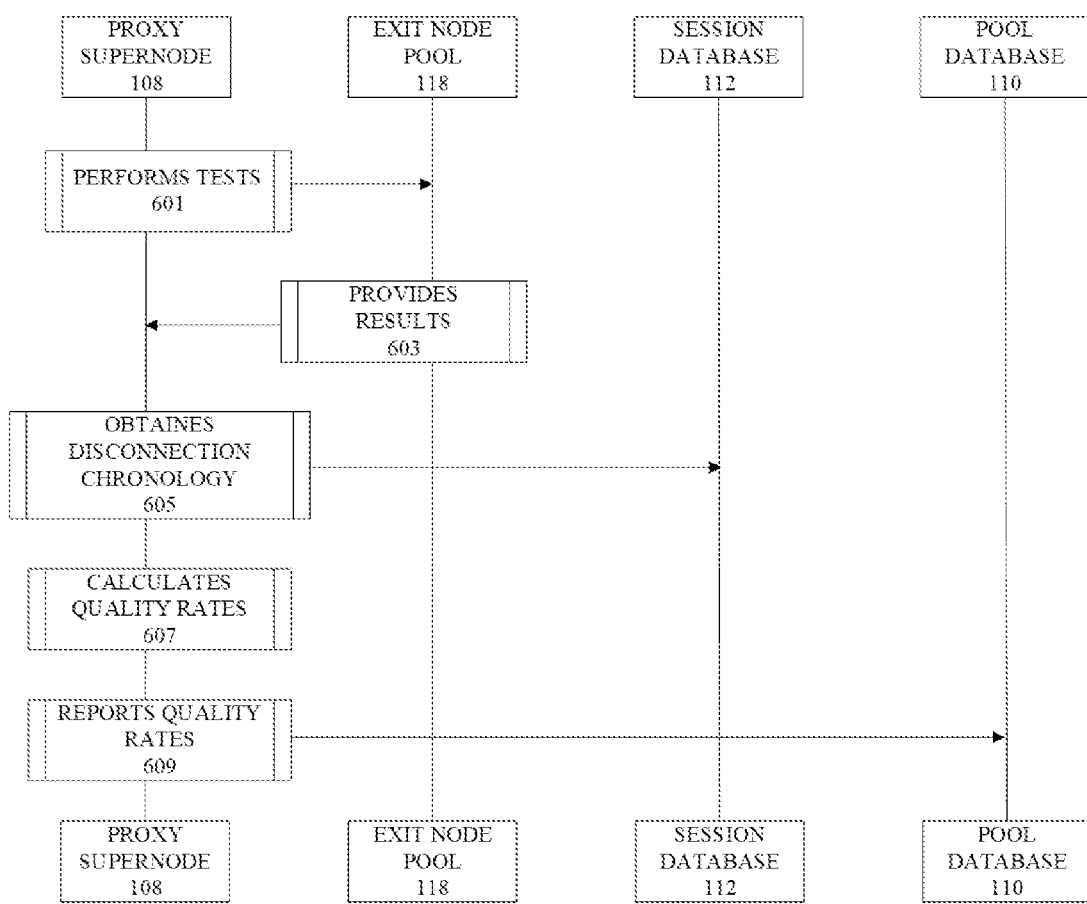
FIG. 6 is an exemplary flow diagram showing the steps involved in calculating the quality rate ($Q_r$) values for exit nodes.

FIG. 6 is an exemplary flow diagram showing the steps involved in calculating the quality rate ($Q_r$) values for exit nodes. In step 601, Proxy Supernode 108 tests each exit node present in the Exit Node Pool 118. The flow diagram shows only an instance of such an operation but Proxy Supernode 108 can concurrently test multiple exit nodes belonging to several exit node pools. Proxy Supernode 108 can test exit nodes by using several methods; however, in the current embodiment, Proxy Supernode 108 carries out benchmark request tests, and ping message tests. Proxy Supernode 108 performs the aforementioned tests in order to evaluate at least the following—a) time taken by a particular exit node to perform benchmark request to a specific target; b) ability to reach specific targets; c) latency while performing ping test against a particular exit node; d) the number of hops between the exit node and Proxy Supernode 108; e) availability of an exit node. The term "Hop" in networking generally refers to the number of network interfaces that a packet (a portion of data) passes through from its source to its destination.

When executing a benchmark request test, Proxy Supernode periodically sends benchmark requests to predefined targets via exit nodes in the Exit Node Pool 118. The targets are dynamically determined by Proxy Supernode 108. Similarly, when executing the ping test, Proxy Supernode periodically sends out a ping message to each exit node in the Exit Node pool 118. Proxy Supernode 108 can use network communication protocols including but is not limited to Internet Control Message Protocol ICMP, TCP and UDP to send the ping message. ICMP is one of the supporting protocols within the Internet Protocol (IP) and is used to send messages and operational information between network devices. However, ICMP is not typically part of regular data communication; ICMP is instead used for establishing and maintaining network communication as a diagnostic and troubleshooting tool. The ICMP ping message can contain up to 64 data bytes and 8 bytes of protocol reader information. Therefore, step 601 is meant to include all necessary steps for sending a benchmark request and a ping message to each exit node in Exit Node Pool 118.

In step 603, each exit node in the Exit Node Pool 118 responds to the tests carried out by Proxy Supernode 108 by providing the appropriate responses. In case of a benchmark test, exit nodes respond by retrieving the necessary data from the intended target and forward the retrieved data to Proxy Supernode 108. Likewise, in case of a ping test, exit nodes respond to the ping message. Moreover, in a ping test, the response is often termed as the pong message. The response simply will echo back the ping message that was sent by Proxy Supernode 108. Therefore, step 603 is meant to include all necessary steps for sending the appropriate responses to both benchmark requests and ping messages.

In step 605, proxy Supernode 108 obtains disconnection chronology for each exit node present in the Exit Node Pool 118 by accessing the Session Database 112. In step 607, after obtaining the disconnection chronology from Session Database 112, Proxy Supernode 108 proceeds to calculate the probability of each exit node's disconnection during the next ten minutes. In the current embodiment, Proxy Supernode 108 is configured by Service Provider Infrastructure 104 to calculate the probability of an exit node's disconnection during the next ten minutes. However, Service Provider Infrastructure 104 can decide through intelligent analysis the time period for which the aforementioned probability is calculated.

Proxy Supernode 108 analyzes the exit nodes' responses and calculates the quality rate value ($Q_r$) for each exit node. Proxy Supernode 108 calculated the quality rate ($Q_r$) value for each exit node by an exemplary formula:

$$Q_r = (\min(\beta/a, 0.5) + \min(\psi/b, 0.5)) \times (1-c)$$

where,

β—benchmark threshold constant, denoting the ideal benchmark request speed (in milliseconds) of an exit node. Here, the value of β is 100.

ψ—ping threshold constant, denoting the ideal ping latency (in milliseconds) of an exit node. Here, the value of ψ is 10.

a—time taken (in milliseconds) by an exit node to perform a benchmark request to a specific target.

b—latency (in milliseconds) while performing ping tests against an exit node.

c—probability that an exit node will disconnect during the next ten minutes, calculated from the disconnection chronology of the particular exit node.

Moreover, the min ( ) function in the above formula takes the minimum value of the given sets, such that the value of each set does not exceed the value of 0.5.

For instance, for a particular exit node, if a=300; b=30; c=0.4 (i.e., 40% probability that the particular exit node will be disconnected during the next ten minutes); then $Q_r$ can be calculated as:

$$Q_r = (\min(100/300, 0.5) + \min(10/30, 0.5)) \times (1-0.4)$$

$$Q_r = (\min(0.33, 0.5) + \min(0.2, 0.5)) \times 0.6$$

$$Q_r = 0.318$$

Since, in the current embodiment the quality rate ($Q_r$) values are assigned on a scale of 0-100, the obtained answer is multiplied by 100. Therefore in the above equation, $$Q_r = 0.318 \times 100 = 31.8$$

In another instance, for a particular exit node, if a=150; b=10; c=0 (i.e., 0% probability that the particular exit node will be disconnected during the next ten minutes); then $Q_r$ can be calculated as:

$$Q_r = (\min(100/150, 0.5) + \min(10/10, 0.5)) \times (1-0)$$

$$Q_r = (\min(0.67, 0.5) + \min(1, 0.5)) \times 1$$

$$Q_r = 1$$

Since, in the current embodiment the quality rate ($Q_r$) values are assigned on a scale of 0-100, the obtained answer is multiplied by 100. Therefore in the above equation, $$Q_r = 1 \times 100 = 100$$

Also, notice that the above example of a particular exit node has quality rate ($Q_r$) value as 100, which implies that the particular exit node has the maximum possible quality rate value.

In another instance, for a particular exit node, if a=90; b=5; c=0.95 (i.e., 95% probability that the particular exit node will be disconnected during the next ten minutes); then $Q_r$ can be calculated as:

$$Q_r = (\min(100/90, 0.5) + \min(10/5, 0.5)) \times (1-0.95)$$

$$Q_r = (\min(1.11, 0.5) + \min(2, 0.5)) \times 0.05$$

$$Q_r = 0.05$$

Since, in the current embodiment the quality rate ($Q_r$) values are assigned on a scale of 0-100, the obtained answer is multiplied by 100. Therefore in the above equation, $$Q_r = 0.05 \times 100 = 5$$

Notice that in the above example, high probability of disconnection can significantly reduce the quality rate ($Q_r$) value.

In step 609, after calculating the quality rate for each exit node present in the Exit Node Pool 118, Proxy Supernode 108 reports the calculated quality rate values ($Q_r$) to Pool Database 110. Specifically, Proxy Supernode 108 reports the calculated quality rate value ($Q_r$) for each exit node according to their pool classification to Pool Database 110.

Figure 7:
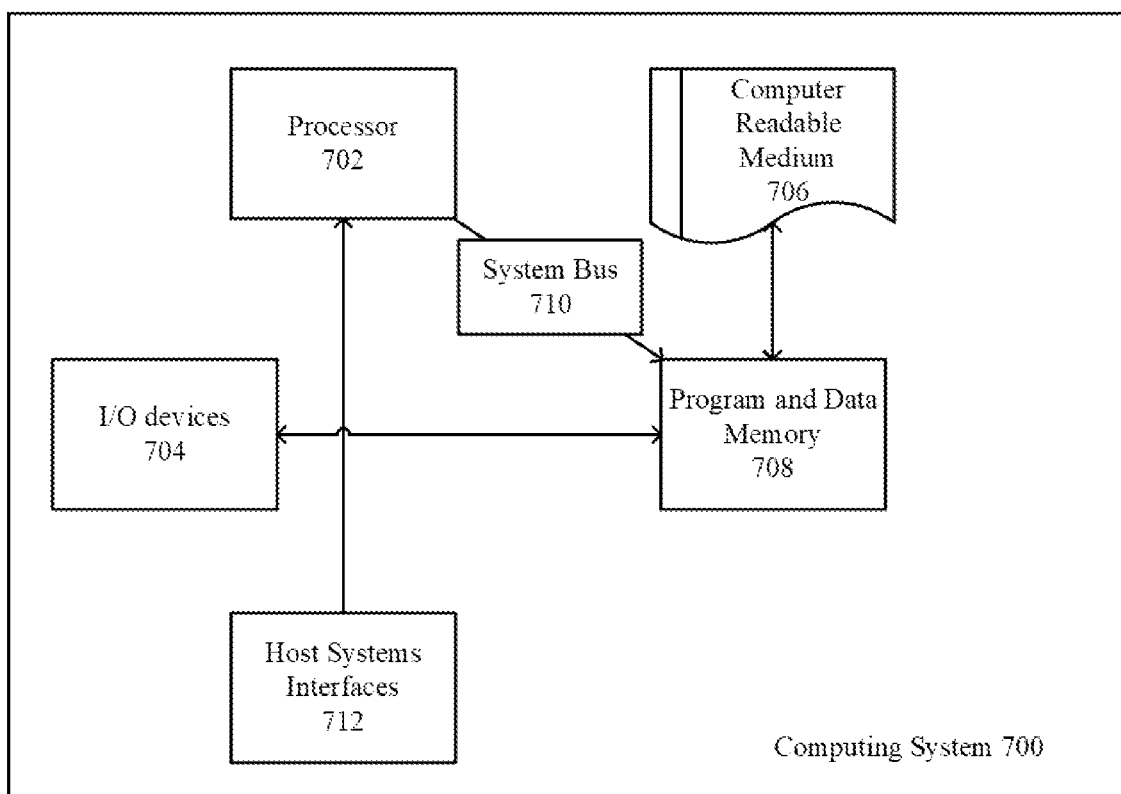
FIG. 7 shows a block diagram of an exemplary computing system.

Generally, the embodiments disclosed herein relate to the field of proxy technologies and services. The embodiments herein may be combined or collocated in a variety of alternative ways due to design choice. Accordingly, the features and aspects herein are not in any way intended to be limited to any particular embodiment. Furthermore, one must be aware that the embodiments can take the form of hardware, firmware, software, and/or combinations thereof. In one embodiment, such software includes but is not limited to firmware, resident software, microcode, etc. FIG. 7 illustrates a computing system 600 in which a computer readable medium 706 may provide instruction for performing any methods and processes disclosed herein.

Furthermore, some aspects of the embodiments herein can take the form of a computer program product accessible from the computer readable medium 706 to provide program code for use by or in connection with a computer or any instruction execution system. For the purposes of this description, the computer readable medium 706 can be any apparatus that can tangibly store the program code for use by or in connection with the instruction execution system, apparatus, or device, including the computing system 700.

The computer readable medium 706 can be any tangible electronic, magnetic, optical, electromagnetic, infrared, or semiconductor system (or apparatus or device). Some examples of a computer readable medium 706 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 700 can include one or more processors 702 coupled directly or indirectly to memory 708 through a system bus 710. The memory 708 can include local memory employed during actual execution of the program code, bulk storage, and/or cache memories, which provide temporary storage of at least some of the program code in order to reduce the number of times the code is retrieved from bulk storage during execution.

Input/output (I/O) devices 704 (including but not limited to keyboards, displays, pointing devices, I/O interfaces, etc.) can be coupled to the computing system 700 either directly or through intervening I/O controllers. Network adapters may also be coupled to the computing system 700 to enable the computing system 700 to couple to other data processing systems, such as through host systems interfaces 712, printers, and/or storage devices through intervening private or public networks. Modems, cable modems, and Ethernet cards are just examples of network adapter types.

The disclosure presents a method for rating proxy servers to implement a user request for data extraction and gathering from a web server, comprising:

computing a capacity value ($C_{avail}$) for an exit node by utilizing present concurrency values (Pχ) of the exit node, wherein:

$$C_{avail} = C_{max} - P\chi$$

and wherein:
"Pχ" is a numerical count by a computing method, which indicates a number of concurrent requests currently being executed by the exit node;
"$C_{max}$" is a maximum capacity value that denotes a maximum number of concurrent requests that can be executed successfully via the exit node; and
calculating a quality rate ($Q_r$) values for the exit node by:
testing the exit node by carrying out benchmark request tests or ping message tests;
obtaining empirical data for the exit node;
analyzing responses from the exit node; and
calculating a quality rate value ($Q_r$);
rating the exit node according to individual $C_{avail}$ and $Q_r$ values.

In the method the rated exit node is in a pool and wherein the rated exit node is used for implementing the user request from a user device for data extraction and gathering from the web server by:
checking the user request to identify requirements for an exit node pool selection that are sent with the request;
choosing a suitable exit node pool conforming to requirements of the request;
retrieving and analyzing metadata of exit nodes belonging to the chosen suitable exit node pool, wherein the metadata retrieved contains quality rates ($Q_r$) and available capacity values ($C_{avail}$) of each exit node in the pool;
identifying the exit nodes with greater than zero available capacity ($C_{avail}$) value;
arranging the exit nodes identified according to the quality rate ($Q_r$) values in a descending order; and,
selecting the exit node with a highest quality rate ($Q_r$) value from the order of the exit nodes.

In the method, if there are multiple exit nodes with an equal highest quality rate ($Q_r$) value, the method selects a random exit node with the highest quality rate ($Q_r$) value at random. If the exit node has a highest quality rate value and has the available capacity value ($C_{avail}$) of zero, another exit node with a second highest quality rate value ($Q_r$) and with an available capacity ($C_{avail}$) value greater than zero is provided to implement the user request. The user request from the user device for data extraction and gathering from the web server may include verification credentials for user validation. The user validation is carried out by verifying credentials sent along with the request against the data from an internal database or an external database. The user request from the user device for data extraction and gathering from the web server may include requirements for exit node pool selection, such as exit node geo-location, ability to reach specific targets, latency. The metadata of the exit nodes in the chosen suitable exit node pool includes, but is not limited to, IP address of each of the exit nodes, geo-location of each of the exit nodes, quality rates ($Q_r$) and available capacity ($C_{avail}$) for each of the exit nodes. The exit node can be used for a new concurrent request from another user device if the exit node has a highest quality rate ($Q_r$) and if the available capacity value ($C_{avail}$) is not zero. The overall performances of the exit nodes belonging to multiple different pools are continuously monitored and empirical data on exit nodes' performances are reported to a database. The available capacity value ($C_{avail}$) of the exit node and the quality rate for the exit node in the pool is stored in a pool database.

By using the described method the exit node is rated and the rated exit node is in a pool and is used for implementing the user request from a user device for data extraction and gathering from the web server by:
checking the user request to identify requirements for an exit node pool selection that are sent with the user request;
choosing a suitable exit node pool conforming to the requirements of the user request;
retrieving and checking metadata of exit nodes belonging to the chosen suitable exit node pool, wherein the metadata retrieved contains quality rates ($Q_r$) and available capacity values ($C_{avail}$) of each exit node in the pool;
analyzing the quality rate ($Q_r$) values;
analyzing the available capacity ($C_{avail}$) values;
selecting the exit node from the chosen pool with a highest quality rate ($Q_r$) and a highest available capacity ($C_{avail}$) value.

The quality rate ($Q_r$) is calculated by using values of the following attributes: a time taken by the exit node to perform a benchmark request to a specific target; a latency while performing a ping test on the exit node; a probability that the exit node will disconnect in a foreseen time frame which is calculated from a disconnection chronology.

The quality rate ($Q_r$) value for the exit node is calculated as:

$$Q_r = (\min(\beta/a, 0.5) + \min(\psi/b, 0.5)) \times (1-c)$$

wherein,
"β" is a benchmark threshold constant, denoting an ideal benchmark request speed (in milliseconds) of the exit node;

"ψ" is a ping threshold constant, denoting an ideal ping latency (in milliseconds) of the exit node;

"a" is a time taken (in milliseconds) by the exit node to perform a benchmark request to a specific target;

"b" is a latency (in milliseconds) while performing a ping test against the exit node;

"c" is a probability that the exit node will disconnect in a foreseen time frame, calculated from a disconnection chronology of the exit node.

The min (ψ/b, 0.5) function takes a minimum value, such that the value does not exceed 0.5.

In the method disclosed, the empirical data of the exit nodes that is used to exit node evaluation can contain, but is not limited to, a disconnection chronology, instances of observed failures and or corrupt responses before reaching maximum capacity value ($C_{max}$), present concurrency (Pχ), effective load, pool assignment timestamps, and a total number of users serviced by the exit node. The disconnection chronology contains a detailed log of connects and disconnects of the exit node from a service provider infrastructure, along with respective timestamps.

In the method, when $C_{avail}$=0, it means that a number of concurrent requests has reached a maximum and additional requests are not sent to the exit node. The maximum capacity value ($C_{max}$) is a fixed number that is initially assigned to the exit node in the pool based on intelligent analysis. If a success rate declines below a minimum tolerance rate for the exit node, the maximum capacity value ($C_{max}$) is re-computed and a different value is assigned to the exit node so that the success rate remains higher than the minimum tolerance value. The minimum tolerance rate denotes a tolerated or accepted success/failure ratio for the exit node executing user requests, is initially a common value configured based on intelligent analysis, and can be changed based on empirical analysis of performance of the exit node.

The maximum capacity value ($C_{max}$) of the exit node in the pool is calculated by:
  calculating a success rate for each Pχ value of the exit node; ensuring that the success rate at every Pχ value is higher than a minimum tolerance rate;
  detecting and identifying exit nodes in a pool with success rates lower than the minimum tolerance rate;
  determining and assigning a new maximum capacity ($C_{max}$) value of the exit node;
  calculating a new success rate of the exit node that is higher than the minimum tolerance rate.

The new maximum capacity ($C_{max}$) value is lowered to a specific Pχ value at which the success rate of the exit node is higher than the minimum tolerance rate.

The method disclosed uses the testing of the exit nodes by carrying out benchmark request tests or ping message tests that are performed at regularly occurring intervals.

In the method disclosed the quality rate ($Q_r$) values are assigned on a scale of 0-100.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential feature or element of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way but may also be configured in ways that are not listed. For the indication of elements, a singular or plural form can be used, but it does not limit the scope of the disclosure and the same teaching can apply to multiple objects, even if in the current application an object is referred to in its singular form.

This disclosure is provided to allow the reader to quickly ascertain the nature of the technical disclosure. It is submitted with the understanding that it will not be used to interpret or limit the scope or meaning of the claims. In addition, in the foregoing detailed description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment.

What is claimed is:

1. A method for rating proxy servers to implement a user request for data extraction and gathering from a web server, comprising:
  computing a capacity value ($C_{avail}$) for an exit node by utilizing present concurrency values (Pχ) of the exit node, wherein:

$$C_{avail} = C_{max} - P\chi$$

and wherein:
    "Pχ" is a numerical count by a computing method, which indicates a number of concurrent requests currently being executed by the exit node;
    "$C_{max}$" is a maximum capacity value that denotes a maximum number of concurrent requests that can be executed successfully via the exit node; and
  calculating quality rate ($Q_r$) values for the exit node by:
    testing the exit node by carrying out benchmark request tests or ping message tests;
    obtaining empirical data for the exit node;
    analyzing responses from the exit node; and
    calculating a quality rate value ($Q_r$);
  rating the exit nodes in an exit node pool according to calculated exit node $C_{avail}$ and $Q_r$ values;

wherein the rated exit node in the exit node pool is used for implementing a user request from a user device for data extraction and gathering from the web server by:
  checking the user request to identify requirements for an exit node pool selection that are sent with the user request;
  choosing a suitable exit node pool conforming to the requirements of the user request;
  retrieving and checking metadata of exit nodes belonging to the chosen suitable exit node pool, wherein the metadata retrieved contains quality rates ($Q_r$) and available capacity values ($C_{avail}$) of each exit node in the pool;
  analyzing the quality rate ($Q_r$) values;
  analyzing the available capacity ($C_{avail}$) values;
  selecting the exit node from the chosen pool with a highest quality rate ($Q_r$) and a highest available capacity ($C_{avail}$) value.

2. The method of claim 1, wherein the quality rate ($Q_r$) is calculated by using values of the following attributes: a time taken by the exit node to perform a benchmark request to a specific target; a latency while performing a ping test on the exit node; a probability that the exit node will disconnect in a foreseen time frame which is calculated from a disconnection chronology.

3. The method of claim 1, wherein the quality rate ($Q_r$) value for the exit node is calculated as:

$$Q_r = (\min(\beta/a, 0.5) + \min(\psi/b, 0.5)) \times (1-c)$$

wherein,
"$\beta$" is a benchmark threshold constant, denoting benchmark request speed (in milliseconds) of the exit node;
"$\psi$" is a ping threshold constant, denoting ping latency (in milliseconds) of the exit node;
"a" is a time taken (in milliseconds) by the exit node to perform a benchmark request to a specific target;
"b" is a latency (in milliseconds) while performing a ping test against the exit node;
"c" is a probability that the exit node will disconnect in a foreseen time frame, calculated from a disconnection chronology of the exit node.

4. The method of claim 3, wherein the min ($\psi/b$, 0.5) function takes a minimum value, such that the value does not exceed 0.5.

5. The method of claim 1, wherein the empirical data contains one of or a combination of: a disconnection chronology, instances of observed failures and or corrupt responses before reaching maximum capacity value ($C_{max}$), present concurrency ($P\chi$), effective load, pool assignment timestamps, or a total number of users serviced by the exit node.

6. The method of claim 5, wherein the disconnection chronology contains a detailed log of connects and disconnects of the exit node from a service provider infrastructure, along with respective timestamps.

7. The method of claim 1, wherein when $C_{avail}=0$, a number of concurrent requests has reached a maximum and additional requests are not sent to the exit node.

8. The method of claim 1, wherein the maximum capacity value ($C_{max}$) is a fixed number that is initially assigned to the exit node in the pool based on intelligent analysis.

9. The method of claim 1, wherein if a success rate declines below a minimum tolerance rate for the exit node, the maximum capacity value ($C_{max}$) is re-computed and a different value is assigned to the exit node so that the success rate remains higher than the minimum tolerance value.

10. The method of claim 9, wherein the minimum tolerance rate denotes a tolerated or accepted success/failure ratio for the exit node executing user requests, is initially a common value configured based on intelligent analysis, and can be changed based on empirical analysis of performance of the exit node.

11. The method of claim 1, wherein the maximum capacity value ($C_{max}$) of the exit node in the pool is calculated by:
  calculating a success rate for each $P\chi$ value of the exit node; ensuring that the success rate at every $P\chi$ value is higher than a minimum tolerance rate;
  detecting and identifying exit nodes in a pool with success rates lower than the minimum tolerance rate;
  determining and assigning a new maximum capacity ($C_{max}$) value of the exit node;
  calculating a new success rate of the exit node that is higher than the minimum tolerance rate.

12. The method of claim 11, wherein the new maximum capacity ($C_{max}$) value is lowered to a specific $P\chi$ value at which the success rate of the exit node is higher than the minimum tolerance rate.

13. The method of claim 1, wherein testing the exit node by carrying out benchmark request tests or ping message tests is performed at regularly occurring intervals.

14. The method of claim 1, wherein the quality rate ($Q_r$) values are assigned on a scale of 0-100.

15. The method of claim 1, wherein the exit node pool contains two or more exit nodes.

16. A method for rating proxy servers to implement a user request for data extraction and gathering from a web server, comprising:
  computing a capacity value ($C_{avail}$) for an exit node by utilizing present concurrency values ($P\chi$) of the exit node, wherein:

$$C_{avail} = C_{max} - P\chi$$

and wherein:
    "$P\chi$" is a numerical count by a computing method, which indicates a number of concurrent requests currently being executed by the exit node;
    "$C_{max}$" is a maximum capacity value that denotes a maximum number of concurrent requests that can be executed successfully via the exit node; and
  calculating quality rate ($Q_r$) values for the exit node by:
    testing the exit node by carrying out benchmark request tests or ping message tests;
    obtaining empirical data for the exit node;
    analyzing responses from the exit node; and
    calculating a quality rate value ($Q_r$);
  rating the exit nodes in an exit node pool according to calculated exit node $C_{avail}$ and $Q_r$ values;
  wherein the rated exit node in the exit node pool and wherein the rated exit node is used for implementing the user request from a user device for data extraction and gathering from the web server by:
  checking the user request to identify requirements for an exit node pool selection that are sent with the request;
  choosing a suitable exit node pool conforming to requirements of the request;
  retrieving and analyzing metadata of exit nodes belonging to the chosen suitable exit node pool, wherein the metadata retrieved contains quality rates ($Q_r$) and available capacity values ($C_{avail}$) of each exit node in the pool;
  identifying the exit nodes with greater than zero available capacity ($C_{avail}$) value;

arranging the exit nodes identified according to the quality rate ($Q_r$) values in a descending order; and, selecting the exit node with a highest quality rate ($Q_r$) value from the order of the exit nodes.

17. The method of claim 16, wherein if there are multiple exit nodes with an equal highest quality rate ($Q_r$) value, the method selects a random exit node with the highest quality rate ($Q_r$) value at random.

18. The method of claim 17, wherein if the exit node has a highest quality rate value and has the available capacity value ($C_{avail}$) of zero, another exit node with a second highest quality rate value ($Q_r$) and with an available capacity ($C_{avail}$) value greater than zero is provided to implement the user request.

19. The method of claim 16, wherein the user request from the user device for data extraction and gathering from the web server may include verification credentials for user validation.

20. The method of claim 16, wherein the user request from the user device for data extraction and gathering from the web server may include requirements for exit node pool selection, such as exit node geo-location, ability to reach specific targets, latency.

21. The method of claim 20, wherein the user validation is carried out by verifying credentials sent along with the request against the data from an internal database or an external database.

22. The method of claim 16, wherein the metadata of the exit nodes in the chosen suitable exit node pool includes, but is not limited to, IP address of each of the exit nodes, geo-location of each of the exit nodes, quality rates ($Q_r$) and available capacity ($C_{avail}$) for each of the exit nodes.

23. The method of claim 16, wherein the exit node can be used for a new concurrent request from another user device if the exit node has a highest quality rate ($Q_r$) and if the available capacity value ($C_{avail}$) is not zero.

24. The method of claim 16, wherein overall performances of the exit nodes belonging to multiple different pools are continuously monitored and empirical data on exit nodes' performances are reported to a database.

25. The method of claim 16, wherein the available capacity value ($C_{avail}$) of the exit node and the quality rate for the exit node in the pool is stored in a pool database.

* * * * *